United States Patent
Dybdal

(10) Patent No.: US 10,056,675 B1
(45) Date of Patent: Aug. 21, 2018

(54) SYSTEMS AND METHODS FOR REDUCING DIRECTIONAL INTERFERENCE BASED ON ADAPTIVE EXCISION AND BEAM REPOSITIONING

(71) Applicant: The Aerospace Corporation, El Segundo, CA (US)

(72) Inventor: Robert B. Dybdal, Palos Verdes Estates, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 15/674,351

(22) Filed: Aug. 10, 2017

(51) Int. Cl.
| | |
|---|---|
| *H01Q 1/12* | (2006.01) |
| *H01Q 25/02* | (2006.01) |
| *H01Q 3/02* | (2006.01) |
| *H04B 1/10* | (2006.01) |

(52) U.S. Cl.
CPC .............. *H01Q 1/1257* (2013.01); *H01Q 3/02* (2013.01); *H01Q 25/02* (2013.01); *H04B 1/1036* (2013.01)

(58) Field of Classification Search
CPC ........ H01Q 1/1257; H01Q 3/02; H01Q 25/02; H04B 1/1036
See application file for complete search history.

(56) References Cited

U.S. PATENT DOCUMENTS

| | | | |
|---|---|---|---|
| 3,883,872 A | 5/1975 | Fletcher et al. | |
| 4,010,468 A | 3/1977 | Fishbein et al. | |
| 4,351,062 A | 9/1982 | Yoshiya | |
| 4,707,697 A | 11/1987 | Coulter et al. | |
| 4,837,576 A | 6/1989 | Schwart | |
| 4,849,764 A | 7/1989 | Van Heyningers | |
| 5,029,184 A | 7/1991 | Andren et al. | |
| 5,263,048 A | 11/1993 | Wade | |
| 5,317,322 A | 5/1994 | Grobert | |
| 5,351,060 A | 9/1994 | Bayne | |
| 5,440,308 A | 8/1995 | Dybdal et al. | |

(Continued)

OTHER PUBLICATIONS

Bottomley et al., "A Generalized RAKE Receiver for Interference Suppression," IEEE Journal on Selected Areas in Communications, 18(8)1536-1545 (2000).

(Continued)

*Primary Examiner* — Bernarr E Gregory
*Assistant Examiner* — Fred H Mull
(74) *Attorney, Agent, or Firm* — Jones Day; Jaime D. Choi

(57) ABSTRACT

Systems and methods are provided for repositioning a directional antenna that responds to a desired signal and directional interference. The antenna can generate a sum beam and first and second difference beams. Respective powers of the sum beam and the first and second difference beams can be determined. At least a portion of any of the directional interference can be excised from the sum beam and the first and second difference beams. Measures of the directional interference can be determined in the sum beam and the first and second difference beams. A first correlation between the sum beam and the first and second difference beams can be generated. Additional correlations between a signal identifier and the sum beam and first and second beams monitor the desired signal reception. The antenna can be repositioned away from the directional interference based on the powers, the measures, and the first correlation.

23 Claims, 10 Drawing Sheets

(56) References Cited

U.S. PATENT DOCUMENTS

| | | |
|---|---|---|
| 5,479,440 A | 12/1995 | Esfahani |
| 5,511,010 A | 4/1996 | Burns |
| 5,671,247 A | 9/1997 | Souissi et al. |
| 5,739,788 A | 4/1998 | Dybdal et al. |
| 5,815,529 A | 9/1998 | Wang |
| 6,031,882 A | 2/2000 | Enge et al. |
| 6,219,334 B1 | 4/2001 | Sato et al. |
| 6,552,995 B1 | 4/2003 | Nakada |
| 6,670,901 B2 | 12/2003 | Brueske |
| 6,868,114 B2 | 3/2005 | Bially et al. |
| 6,975,673 B1 | 12/2005 | Rouquette |
| 7,099,270 B2 | 8/2006 | Yamaguchi |
| 7,173,990 B2 | 2/2007 | Kim et al. |
| 7,209,567 B1 | 4/2007 | Kozel et al. |
| 7,212,569 B1 | 5/2007 | Clark |
| 7,277,475 B1 | 10/2007 | Nguyen et al. |
| 7,366,243 B1 | 4/2008 | McCrady |
| 7,573,947 B2 | 8/2009 | Arad |
| 7,860,476 B1 | 12/2010 | Karr et al. |
| 7,894,556 B2 | 2/2011 | Casabona et al. |
| 8,050,336 B2 | 11/2011 | Bocquet |
| 8,155,218 B2 | 4/2012 | Hong et al. |
| 8,199,851 B1 | 6/2012 | Dybdal et al. |
| 8,238,410 B2 | 8/2012 | Lennen |
| 8,259,857 B2 | 9/2012 | Dybdal et al. |
| 8,275,067 B2 | 9/2012 | Garg et al. |
| 8,462,879 B2 | 6/2013 | Dybdal et al. |
| 8,614,940 B1 | 12/2013 | Dybdal et al. |
| 8,711,675 B1 | 4/2014 | Dybdal et al. |
| 8,804,808 B1 | 8/2014 | Dybdal et al. |
| 9,065,521 B1 | 6/2015 | Dybdal et al. |
| 9,628,122 B1 | 4/2017 | Clark et al. |
| 2002/0094022 A1 | 7/2002 | Bailly |
| 2002/0094044 A1 | 7/2002 | Kolze et al. |
| 2004/0235445 A1 | 11/2004 | Gomez |
| 2005/0047487 A1 | 3/2005 | Sakaue et al. |
| 2006/0153283 A1 | 7/2006 | Scharf et al. |
| 2006/0291375 A1 | 12/2006 | Nishikawa |
| 2007/0076783 A1 | 4/2007 | Dishman et al. |
| 2008/0260014 A1 | 10/2008 | Yang et al. |
| 2009/0225823 A1 | 9/2009 | Chen et al. |
| 2009/0257471 A1 | 10/2009 | Tanaka et al. |
| 2010/0195711 A1 | 8/2010 | Hasan et al. |
| 2010/0195775 A1 | 8/2010 | Chamberlain |
| 2010/0198588 A1 | 8/2010 | Sudo et al. |
| 2010/0303182 A1 | 12/2010 | Daneshrad et al. |
| 2011/0053546 A1 | 3/2011 | Hess et al. |
| 2011/0090053 A1* | 4/2011 | Soula ............... H01Q 25/002 340/10.1 |
| 2011/0090939 A1 | 4/2011 | Diener et al. |
| 2011/0200089 A1 | 8/2011 | Umeda et al. |
| 2011/0260920 A1 | 10/2011 | Dybdal et al. |
| 2011/0268169 A1 | 11/2011 | Mitsugi et al. |
| 2012/0244819 A1 | 9/2012 | Tang |
| 2014/0004812 A1 | 1/2014 | Haub et al. |

OTHER PUBLICATIONS

Calhoun, "Third Generation Wireless Systems, vol. 1, Post-Shannon Signal Architectures,", Boston. pp. 344-376 (2003).

Dybdal and Hinshilwood, "Deaden: a new adaptive cancellation technique," 1995 IEEE MILCOM Symposium Digest, San Diego, CA Nov. 5-8, 1995 (5 pages).

Dybdal et al., "An uplink antenna for electronic beam steering and interference reduction," 2002 IEEE EP-S Symposium Digest, San Antonio, TX, Jun. 16-21, 2002 (4 pages).

Jiang et al., "Multiuser MIMO-OFDM for Next-Generation Wireless Systems," Proceedings of the IEEE, 95 (7):1430-1469 (2007).

Johnson et al., "Blind Equalization Using the Constant Modulus Criterion: A Review," Proceedings of the IEEE, 86 (10):1927-1950 (1998).

Proakis et al., "Contemporary Communication Systems Using MATLAB® and Simulink® , Second Edition," Brooks/Cole Publishing Co., St. Paul, MN, pp. 268-273 (2004).

* cited by examiner

SYSTEMS AND METHODS FOR REDUCING DIRECTIONAL INTERFERENCE BASED ON ADAPTIVE EXCISION AND BEAM REPOSITIONING

STATEMENT OF GOVERNMENT INTEREST

This invention was made with government support under Contract No. FA8802-14-C-0001 awarded by the Department of the Air Force. The government has certain rights in the invention.

FIELD

This application generally relates to systems and methods for reducing interference contained in signals.

BACKGROUND

An antenna main beam can be repositioned so as to reduce directional interference that is located near the main beam's perimeter. However, canceling directional interference that is within the antenna main beam while maintaining desired signal reception can be difficult. For example, maximum S/N (Signal-to-Noise ratio) and maximum SNIR (Signal to Noise plus Interference ratio) cannot be simultaneously optimized and some power of the desired signal can be sacrificed in order to reduce the interference.

A previously known approach to main beam interference protection uses a cluster of much narrower beams to achieve both reception and cancellation. However, such an approach can use a relatively large (and expensive) antenna to produce the narrower beams, and can be associated with the additional complexity of implementing and processing a cluster of beams and a significant amount of processing to derive the adaptive weighting needed to cancel interference.

SUMMARY

Systems and methods are provided herein for reducing interference based on adaptive excision and beam repositioning. For example, the present systems and methods can provide both adaptive beam repositioning so as to inhibit effects of directional interference and/or adaptive excision of such interference to maintain system linearity thus reducing design complexity with a relatively affordable implementation that can be applied to existing antennas while providing additional information on interference and further capabilities in beam repositioning.

Under one aspect, a system is provided for repositioning a directional antenna that responds to a desired signal and directional interference. The antenna generates a sum beam and first and second difference beams. The system can include an antenna positioner coupled to the directional antenna, and a controller coupled to the antenna positioner. The system also can include power detectors respectively configured to output to the controller powers of the sum beam and the first and second difference beams. The system also can include excision circuits respectively configured to (a) excise at least a portion of any of the directional interference from the sum beam and the first and second difference beams and (b) output to the controller a measure of the directional interference in that beam. The system also can include a first correlator configured to output to the controller a first correlation between the sum beam and the first and second difference beams. The controller can be configured to control the antenna positioner so as to reposition the antenna away from the directional interference based on the powers, the measures, and the first correlation.

In some configurations, each of the excision circuits is configured to digitize the sum beam or the first or second difference beam, and provide as output a set of spectral bins for that beam spanning a bandwidth of the desired signal, each bin having a respective power level, at least one bin including the interference. Each of the excision circuits also can be configured to compare a collective power level of the bins to a predetermined threshold, and based upon the collective power level exceeding the predetermined threshold, excise at least one bin that includes the interference. Optionally, the measures can include the power levels of the bins from the digitized first difference beam, the power levels of the bins from the digitized second difference beam, and the power levels of the bins from the digitized sum beam. Optionally, the controller can be configured to control the antenna positioner so as to reposition the antenna based on: a distance between the interference and the desired signal in a first plane determined based on a ratio of the power levels of the bins from the digitized first difference beam and the power levels of the bins from the digitized sum beam; and a distance between the interference and the desired signal in a second plane determined based on a ratio of the power levels of the bins from the digitized second difference beam and the power levels of the bins from the digitized sum beam. The second plane can be orthogonal to the first plane. As a further option, the controller can be configured to control the antenna positioner so as to reposition the antenna further based on a sign of the first correlation indicating a direction of the interference in the first and second planes.

Additionally, or alternatively, the predetermined threshold can be selected such that the collective power of the spectral bins following excision is sufficiently low to maintain linear operation of the system.

Additionally, or alternatively, the controller can be configured to control the antenna positioner so as to reposition the antenna to place the directional interference within a null between the main beam and a sidelobe of the main beam.

Additionally, or alternatively, the controller further can be configured to, based upon the measures being below a threshold, control the antenna positioner so as to track the desired signal in a closed loop; and based upon the measures exceeding the threshold, control the antenna positioner so as to cease tracking the desired signal. The controller further can be configured to, after controlling the antenna positioner so as to reposition the antenna away from the directional interference, control the antenna positioner so as to resume tracking the desired signal in a closed loop so as to sufficiently maintain power of the desired signal received by the antenna while sufficiently reducing power of the directional interference received by the antenna.

Additionally, or alternatively, the desired signal further can include a signal identifier. In some configurations, the system further can include a second correlator configured to output to the controller a second correlation between the signal identifier and the sum beam; and third and fourth correlators respectively configured to output to the controller their correlations between the signal identifier and the first and second difference beams. The controller further can be configured to control the antenna positioner so as to reposition the antenna away from the directional interference based on the second, third, and fourth correlations. Optionally, the signal identifier comprises a pseudorandom code added to the desired signal. Optionally, the signal identifier comprises an existing feature of the desired signal.

Under another aspect, a method is provided for repositioning a directional antenna that responds to a desired signal and directional interference. The antenna can generate a sum beam and first and second difference beams. The method can include determining respective powers of the sum beam and the first and second difference beams, and excising at least a portion of any of the directional interference from the sum beam and the first and second difference beams. The method also can include determining measures of the directional interference in the sum beam and the first and second difference beams, and generating a first correlation between the sum beam and the first and second difference beams. The method also can include repositioning the antenna away from the directional interference based on the powers, the measures, and the first correlation.

Under yet another aspect, a method is provided for repositioning a directional antenna that responds to a desired signal and directional interference. The antenna generates a sum beam and first and second difference beams. The method can include determining respective powers of the sum beam and the first and second difference beams, and excising at least a portion of any of the directional interference from the sum beam and the first and second difference beams. The method also can include determining measures of the directional interference in the sum beam and the first and second difference beams, and generating a first correlation between the sum beam and the first and second difference beams. The method also can include, based upon the excision sufficiently removing the directional interference, tracking the desired signal; and based upon the excision insufficiently removing the directional interference, repositioning the antenna away from the directional interference based on the powers, the measures, and the first correlation.

DETAILED DESCRIPTION

Systems and methods are provided herein for reducing interference based on adaptive excision and beam repositioning. As provided herein, adaptive excision and beam repositioning can be co-implemented so as to maintain linear operation when higher level interference is present, to provide increased interference location capabilities, and to dynamically determine interference spectral characteristics which can vary over time. For example, if a receiver or transponder receives both a desired signal and directional interference, the composite of the desired signal and interference can result in nonlinear system operation and/or the inability to distinguish the interference from the signal. The present systems and methods can reduce the effect of such directional interference by removing spectral components of such interference and/or by repositioning the antenna so as to reduce or exclude such interference, in real-time. This additional interference protection can be incorporated into existing system designs with relatively modest implementation expense.

Figure 5A:
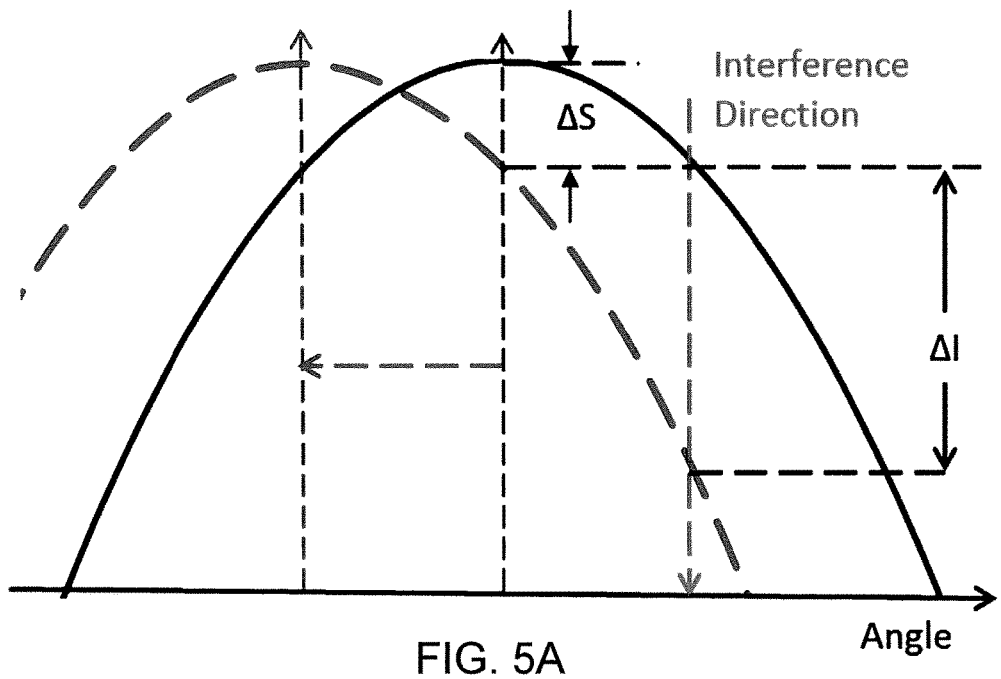
FIG. 5A illustrates a plot of powers of a desired signal and directional interference as a function of angle, according to one exemplary configuration.
Figure 5B:
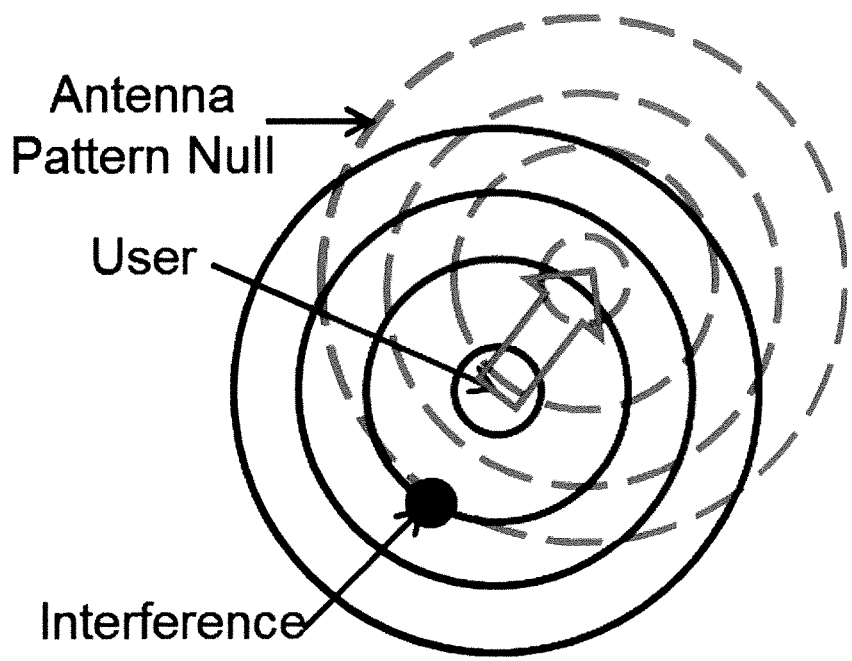
FIG. 5B schematically illustrates beam pattern contours for a desired signal and directional interference, according to one exemplary configuration.
Figure 5C:
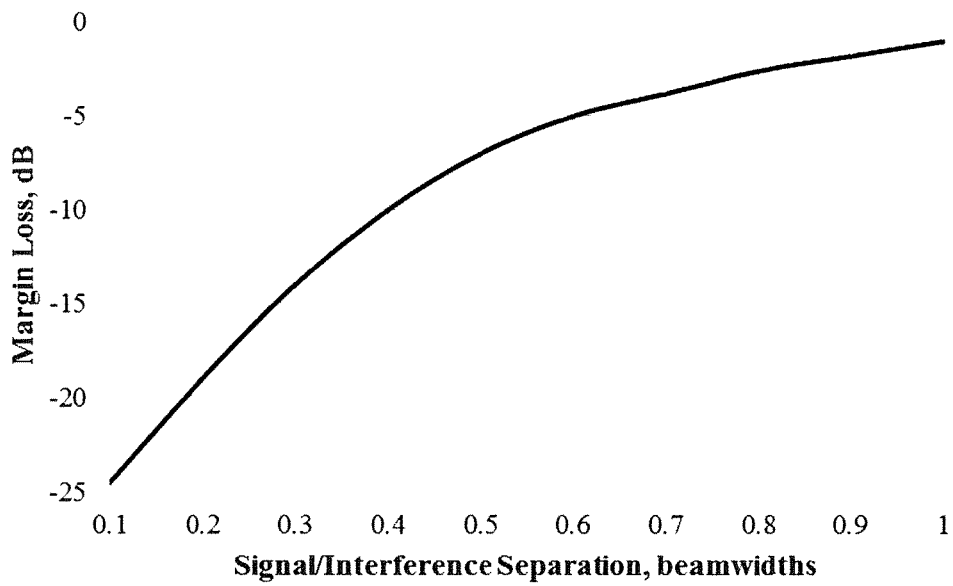
FIG. 5C illustrates a plot of signal margin loss versus angular separation between a desired signal and directional interference, according to one exemplary configuration.

Adaptive beam positioning is a relatively affordable alternative that simply moves the main beam away from directional interference so as to reduce interference by an amount $\Delta I$ that is greater than the desired signal reduction $\Delta S$ such as illustrated by the exemplary pattern cut and contours respectively shown in FIG. 5A, and in FIG. 5B, which schematically illustrates beam pattern contours for a desired signal and directional interference. For example, the pattern null between the main beam and first sidelobe of the main beam can be aligned with the directional interference. The corresponding loss in the desired signal margin after this alignment, such as illustrated in FIG. 5C, which relates the desired signal margin loss to the angular separation between a desired signal and directional interference, can depend on the angular separation between the desired signal and interference. The desired signal margin reduction can be accommodated because high frequency systems can include significant rain margin to maintain power availability that in clear weather can provide additional power margin that is available for beam repositioning. In addition, communications can use adaptive coding to combat rain loss by reducing the data rate so as to allow communication albeit at a lower data rate. Adaptive coding likewise responds to the desired signal reduction when adaptive beam repositioning is used. Adaptive beam repositioning can be viewed as a "step aside" approach.

Adaptive beam repositioning was originally motivated to protect satellite uplink point-to-point antennas from interference. Such links can operate at higher SHF (super high frequencies, e.g., 3 GHz to 30 GHz) and EHF (extremely high frequencies, e.g., 30 GHz to 300 GHz) so to achieve high data rates, and can have relatively narrow beamwidths with high gain to accommodate high data rate transfer. Such systems also can use closed loop monopulse tracking so as to maintain beam alignment with the ground terminal. Monopulse tracking uses a sum beam that receives the desired signal and two orthogonally aligned difference beams having pattern nulls coincident with the sum beam's axis. The ratios of the difference beams to the sum beam form error responses in their respective orthogonal planes that are inputs to the antenna's control system forming a closed loop method to dynamically maintain alignment with the signal, as is well known in the art. The ground terminals can be located in protected areas but concern exists for potential interference located on the uplink beam's coverage area perimeter. These systems often provide waveform protection from interference in the form of spread spectrum modulation to dilute interference power, interleaving to randomize bit errors, and error correction coding. For intentional directional interference to be effective, its power level must exceed this waveform protection and thus dominates the desired signal.

Figure 6A:
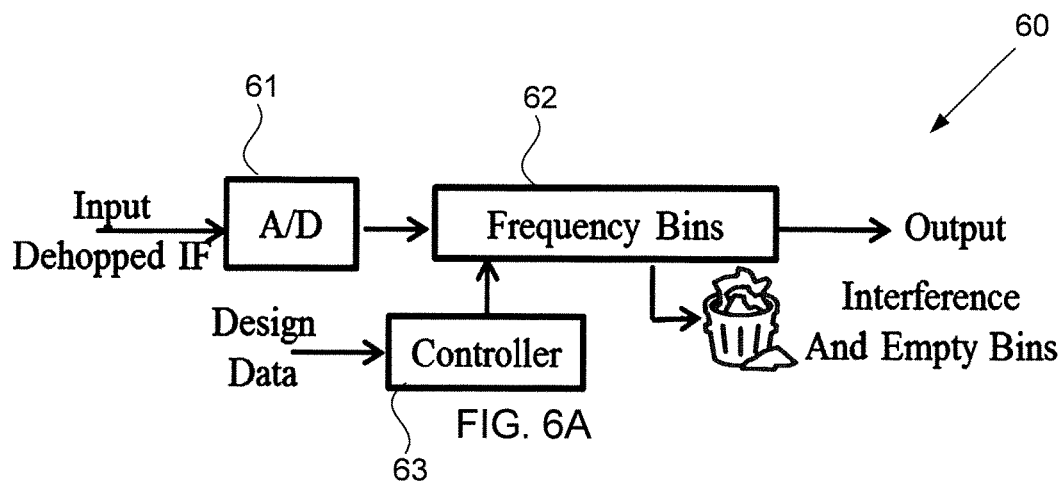
FIG. 6A schematically illustrates an adaptive excision circuit, according to one exemplary configuration.
Figure 6B:
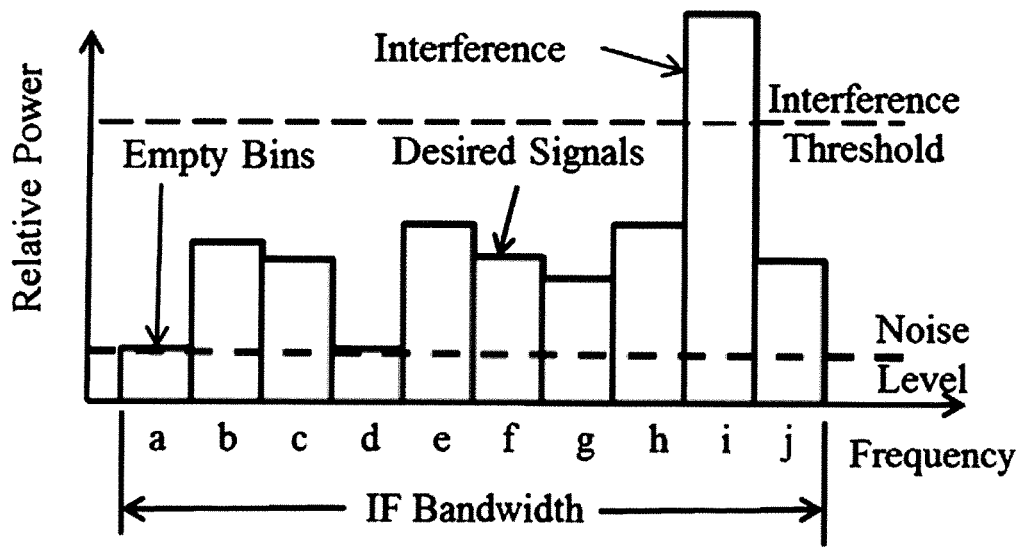
FIG. 6B schematically illustrates a frequency-domain representation of a set of bins of a digitized signal including interference.

Adaptive excision can inhibit high level interference from producing nonlinear system operation that degrade communications. Nonlinear operation can degrade communication by generating intermodulation products and suppressing desired signal levels. Threshold power levels can be established from a priori system design data and are translated to analog-to-digital (A/D) input power levels that can produce nonlinear system operation. The A/D quantization and preceding analog electronics gain can be selected to remain linear for the highest anticipated interference power level. The received signal plus interference can be digitized, and a set of spectral bins generated. A sufficient number of frequency bins with interference can excised, e.g., set to zero, to maintain system linearity. For example, FIG. 6A schematically illustrates an adaptive excision circuit that can be used, for example, in a receiver or transponder, according to one exemplary configuration. Excision circuit 60 illustrated in FIG. 6A includes analog-to-digital (A/D) converter 61, frequency bin generator 62, and controller 63. A/D converter 61 digitizes an input signal, which can include a desired signal and interference, e.g., a dehopped intermediate frequency (IF) signal. Frequency bin generator 62 can be configured so as to provide as output a set of spectral bins. Controller 63, taking as input design data (such as based on a priori system design data) can control frequency bin generator 62 so as to excise certain spectral bins. For example, FIG. 6B illustrates a frequency-domain representation of a set of bins of a digitized signal including interference such as can be generated using frequency bin generator 62. An example instantaneous IF spectrum such as in FIG. 6B indicates high level interference in one bin and two empty bins containing only noise without communication value; both types of bins can be excised based on control by controller 63. Adaptive excision, such as implemented using excision circuit 60, can operate continuously on the input data streams and the thresholding allows dynamically filtering high level interference to prevent nonlinear operation of the electronics following excision. By contrast, conventional adaptive notch filtering uses iterative algorithms that are subject to averaging time delays in their operation and thus cannot dynamically respond to interference changes and do not provide a spectral description of the interference. Adaptive excision also provide a means to dynamically monitor the total traffic received by the system so that desired users, undesired interference, and unoccupied portion of the spectrum are displayed in real time.

For further details regarding previously known beam repositioning, see U.S. Pat. No. 5,739,788 to Dybdal et al., the entire contents of which are incorporated by reference herein. For further details regarding previously known adaptive excision, see U.S. Pat. Nos. 8,614,940 and 8,711,675 to Dybdal et al., the entire contents of each of which are incorporated by reference herein.

As provided herein, adaptive excision circuitry and beam repositioning can be used together synergistically so as to provide additional protection against directional interference and enhance link performance for directional antennas. For example, adaptive excision can provide additional information to guide repositioning of directional antennas, and can dynamically analyze spectral and temporal interference characteristics, in addition to providing prefiltering so as to help maintain linear system operation. In configurations provided herein, excision circuits respectively can generate spectral bins for each of digitized sum and first and second difference beams of the received signal, which can include the desired signal and directional interference, received by the directional antenna. The spectral bins for each of the sum and the first and second difference beams can span the bandwidth of the desired signal, and can provide a measure of directional interference in the beam that can be used so as to reposition the antenna. Additionally, any spectral bins that contain interference can be excised, for example if such bins contain a sufficiently high power, and optionally also if the collective power level of all of the bins for the sum or the first or second difference beams exceeds a predetermined threshold. Excising interference-containing bins when one or both of such conditions are met can be useful because if the collective power level of all of the bins in that beam is sufficiently low that the receiver operates within its linear range, then any directional interference may not necessarily cause additional distortion of the desired signals. Instead, the measures of directional interference that the excision circuits generate can be used to reposition the directional antenna without necessarily excising any interference. Conversely, if the excision circuits can excise sufficient interference to maintain acceptable signal reception, the directional antenna need not necessarily be repositioned. Directional interference can be reduced using any suitable combination of antenna repositioning and excision, and can maintain linear system operation.

First, an overview of an exemplary system and components therein will be provided. Then, exemplary methods of using such a system will be described.

Figure 1A:
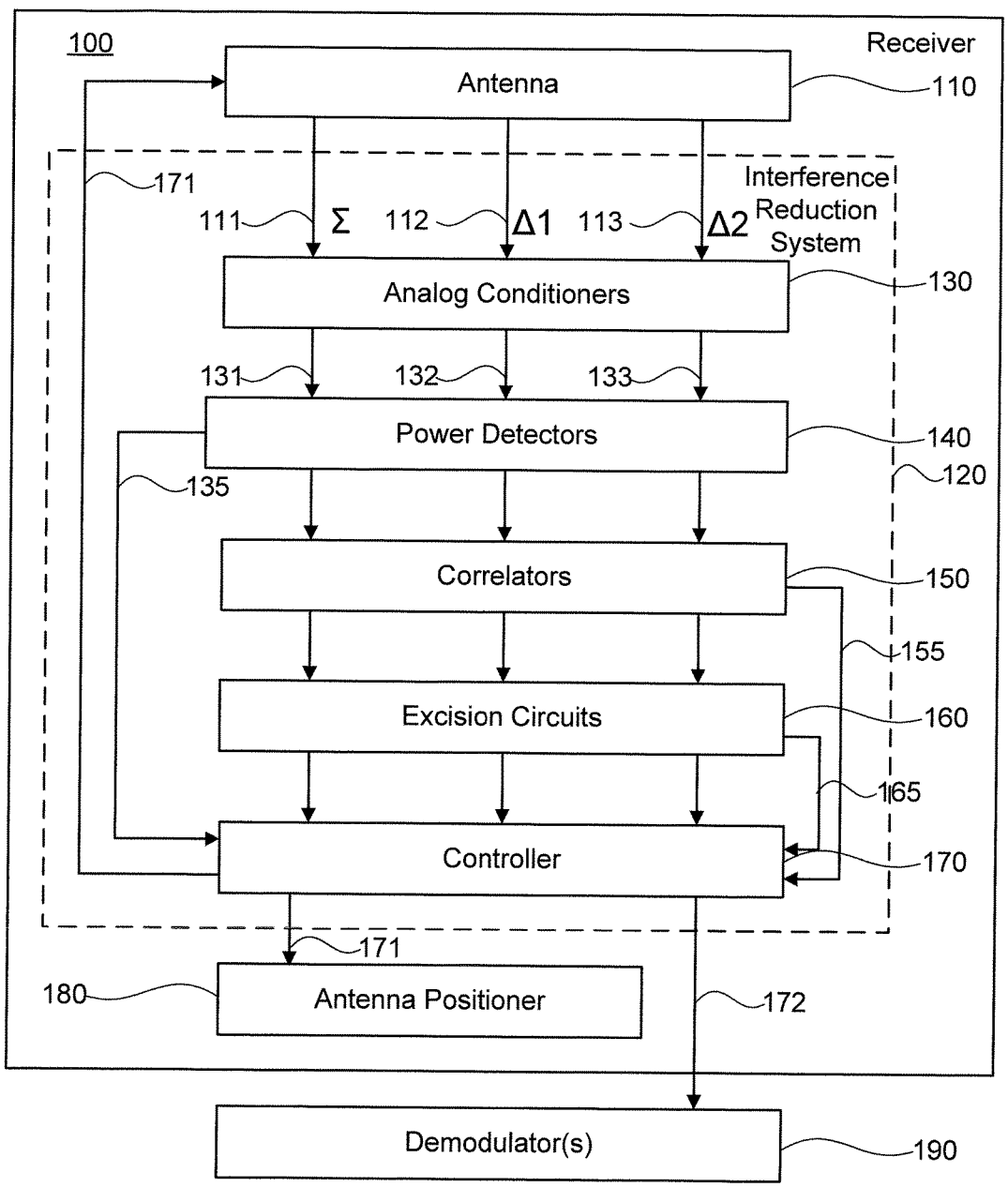
FIG. 1A schematically illustrates a system for reducing interference in a receiver, according to one exemplary configuration.

FIG. 1A schematically illustrates a system 120 for reducing interference in a receiver, according to one exemplary configuration. In this example, receiver 100 can include antenna 110 having a directional reflector configured to receive a main beam and to generate a sum beam 111 (Σ) and first and second difference beams 112, 113 (Δ1 and Δ2) based thereon, one or more demodulators 190 configured to decode the information contained within the sum beam, and interference reduction system 120 disposed there between. In the illustrated configuration, interference reduction system 120 includes analog conditioners 130; power detectors 140; correlators 150; excision circuits 160; controller 170 including processing circuitry acting on the sum and two difference beams to dynamically align the antenna with the signal direction; and antenna positioner 180 configured to reposition the antenna based on the output of controller 170.

Antenna 110 illustrated in FIG. 1A can be or include a directional antenna configured to wirelessly receive a main beam that includes a desired signal and potentially also directional interference which can spectrally and/or spatially overlap the desired signal, and to output a sum beam 111 (Σ) and first and second difference beams 112, 113 (Δ1, Δ2) based thereon. For example, antenna 110 includes a monopulse tracking capability such as used in communication systems having high gain, narrow beamwidth antennas or in tracking radar systems. Appropriate antenna designs for a variety of signals in a variety of contexts, e.g., terrestrial, aircraft, or space-based antennas, are known in the art. In some configurations, antenna 110 can be a pre-existing structure to which interference reduction system 120 can be coupled.

Analog conditioners 130 can be configured to receive the sum and first and second difference beams 111, 112, 113 and to output corresponding conditioned analog signals 131, 132, 133. For example, each of the analog conditioners 130 can include a plurality of input RF filters to select the bandwidth containing desired signal components and their dynamic power levels and reject other signals at frequencies outside of that bandwidth, a low noise amplifier to establish the system noise level, and can contain one or more down-converters to translate the RF bandwidth containing the analog signals into the bandwidth over which the interference reduction system 120 operates. The conditioned sum and difference beams 131, 132, and 133 can be output to power detectors 140, correlators 150, and excision circuits 160 (not all connections shown).

Analog power detectors 140 can be configured so as to detect respective average power levels of the conditioned sum 131 and each of the conditioned difference beams 132, 133 and output each of these analog detected powers to controller 170 at 135. Correlators 150 can be configured so as to measure the correlation of the conditioned sum and difference beams 131, 132, 133 and also the correlations of the conditioned sum and difference beams 131, 132, 133 with a desired signal feature, such as with P(t) 15 described further below with reference to FIG. 1C. These analog correlation values can be routed to the controller 170 at 155.

Collectively, the correlation, the adaptive excision, and the average power values can be referred to as indicators that provide data on which the controller 170 operates, and further provides diagnostic insight on system operation. The parameters these indicators provide can differ in their operation. For example, the ratio of the difference and sum values of the average power detectors (which values are referred to as $P_A$ and $P_\Sigma$ in FIG. 1C), the cross correlation of the sum and difference beams (referred to as $X_{A\Sigma}$ in FIG. 1C), and the correlation values with the desired signal feature (referred to as $X_{\Sigma P}$ and $X_{AP}$ in FIG. 1C) can verify correct operation of the monopulse tracking when interference is not present. The average received power ($P_\Sigma$ in FIG. 1C) and the power summed by the adaptive excision circuitry can provide the signal traffic levels that can be used to set the transmitter gain levels to allow the system 100 to maintain its design operating point optimizing its power efficiency; further the average power ($P_\Sigma$ in FIG. 1C) can provide system operators with information of the system utilization, as can the correlation (referred to as $X_{\Sigma P}$ in FIG. 1C) with the desired signal feature (referred to as P(t) in FIG. 1C). The adaptive excision values are not limited by power detector averaging and also can indicate the spectral distribution, the presence of excessive interference, and unoccupied portions of the spectrum that can be excised. In some cases, frequency bins containing unauthorized users can also be excised.

In some configurations, correlators 150 illustrated in FIG. 1A can include two correlators that respectively are configured to output to the controller 170 two correlation values 155 between the sum beam and each of the two orthogonally aligned difference beams. Under quiescent interference-free conditions, such correlation values can be expected to be relatively low and comparable in value because the desired signal is properly aligned with the signal. When interference is present, however, the correlation values can depend on both the desired signal and the interference. Further, because the interference can be separated from the desired signal source, the correlation values can increase because the interference is not aligned with the difference null. Moreover, the correlation values may no longer be comparable, thus providing further evidence of significant interference.

Three additional correlation values can be generated by correlators 150 between a desired signal feature (referred to as 31 in FIG. 1C) and the sum and two difference signals (referred to as 15 and 25 in FIG. 1C) following a beam repositioning method such as described in U.S. Pat. No. 5,739,788 to Dybdal et al. The signal feature can be or include an embedded pseudorandom code and/or characteristics of the desired signal such as a frame format, preamble, or other characteristics unique to the desired signal as found in communication or radar signals. The signal feature can be referred to as a signal identifier. Such correlation values can in some configurations respond only to the desired signal since the interference and the thermal noise components lack the identifying feature so that their correlation products are zero. Under quiescent conditions, the sum correlation value indicates the received signal power and the two difference correlation values are smaller and comparable in level since they are received by the difference pattern nulls. The ratios of the difference and sum values can be relatively small and also can indicate proper monopulse operation. These ratios are comparable and indicate proper desired signal tracking.

Within the exemplary interference reduction system 120 illustrated in FIG. 1A, excision circuits 160 respectively are configured to receive conditioned analog signals 131, 132, 133 respectively corresponding to the sum and first and second difference beams. In a manner similar to that described above with reference to FIG. 6A, excision circuits 160 respectively can be configured to digitize the IF input signal, divide the digitized IF input signal into spectral frequency bins, and to analyze the spectra and power of each of the conditioned sum and first and second difference beams 131, 132, 133, and based on exceeding the predetermined threshold level analysis to excise at least one spectral bin from at least one of the sum and first and second difference beams that includes interference and to provide the resulting outputs to controller 170. Additionally, excision circuits 160 respectively can be configured to utilize the excised interference bins together with the correlation values to generate a measure of the directional interference within the frequency bins of the sum and first and second difference beams and to output such measures 165 to controller 170, based upon which controller 170 can command antenna positioner 180 to reposition antenna 110.

For example, in a manner similar to that described below with reference to FIG. 4, each of the excision circuits 160 can be configured to digitize the conditioned sum beam 131 and first and second difference beams 132, 133; to provide as output a set of spectral bins for that beam spanning a bandwidth of the desired signal, each bin having a respective power level, at least one bin including the interference; to compare a collective power level of the bins to a predetermined threshold; and based upon the collective power level exceeding the predetermined threshold, excise at least one bin that includes the interference. In a manner similar to that described in U.S. Pat. Nos. 8,614,940 and 8,711,675 to Dybdal et al., the predetermined threshold can be selected such that the collective power of the spectral bins following excision is sufficiently low to maintain linear operation of the system. The outputs and measures 165 of such excision can be provided to controller 170. Additionally, the measures of the directional interference in the sum and first and second difference beams containing interference respectively can be, or include, the power levels of the bins from the digitized first difference beam, the power levels of the bins from the digitized second difference beam, and the power levels of the bins from the digitized sum beam.

When interference is not present (e.g., corresponding to a condition where the threshold is not exceeded at 302 in FIG. 3A described in greater detail below), the system can track the desired signal using the design closed loop monopulse capability. In this case, the contents of the system's frequency bins do not exceed the threshold levels that result in frequency bin excision. Interference, if present, can have a level insufficient so that excision need not necessarily be performed, and the waveform interference protection can maintain desired signal reception. If sufficient interference is present (e.g., corresponding to a condition in which the threshold is exceeded at 302 in FIG. 3A), such interference can be dynamically indicated in the excision circuitry thresholds (represented in FIG. 1C by $I_\Sigma$ and the two $I_A$ values). Initially, the presence of excessive interference in the frequency bins prompts a command issued by the controller to cease closed loop tracking (corresponding to 303 in FIG. 3A). The excision circuitry dynamically identifies interference initiation whereas the outputs of the power detectors and correlators are averaged. The normal closed loop tracking can be perturbed by interference and by initially fixing the antenna position, the necessary measurements and processing to reposition the antenna to reduce interference can be accomplished without changes in the initial quiescent beam alignment. When interference is present, the antenna tracking is open loop commanded by the controller 170 based on the correlation measurements and the excised frequency bins (corresponding to 306 in FIG. 3A).

The antenna repositioning method disclosed by U.S. Pat. No. 5,739,788 to Dybdal et al. can isolate the desired signal levels in the sum and two difference beams using correlation values (corresponding to 15 and 25 in FIG. 1C) using the signal identifier (corresponding to 31 in FIG. 1C) and does not respond to either interference or noise components. As provided herein, excessive interference is indicated by threshold levels in the excision circuitry $I_\Sigma$ and two $I_A$ values for each orthogonally aligned difference beam and interference dominates the signal power because of its higher level. The abilities to separately measure interference by the addition of excision circuitry and to separately use the correlation outputs $X_{\Sigma P}$ and $X_{AP}$ that respond only to the desired signal can provide the data used by the controller 170 to open loop command main beam repositioning to align the pattern null circumscribing the main beam with the interference.

Figure 2A:
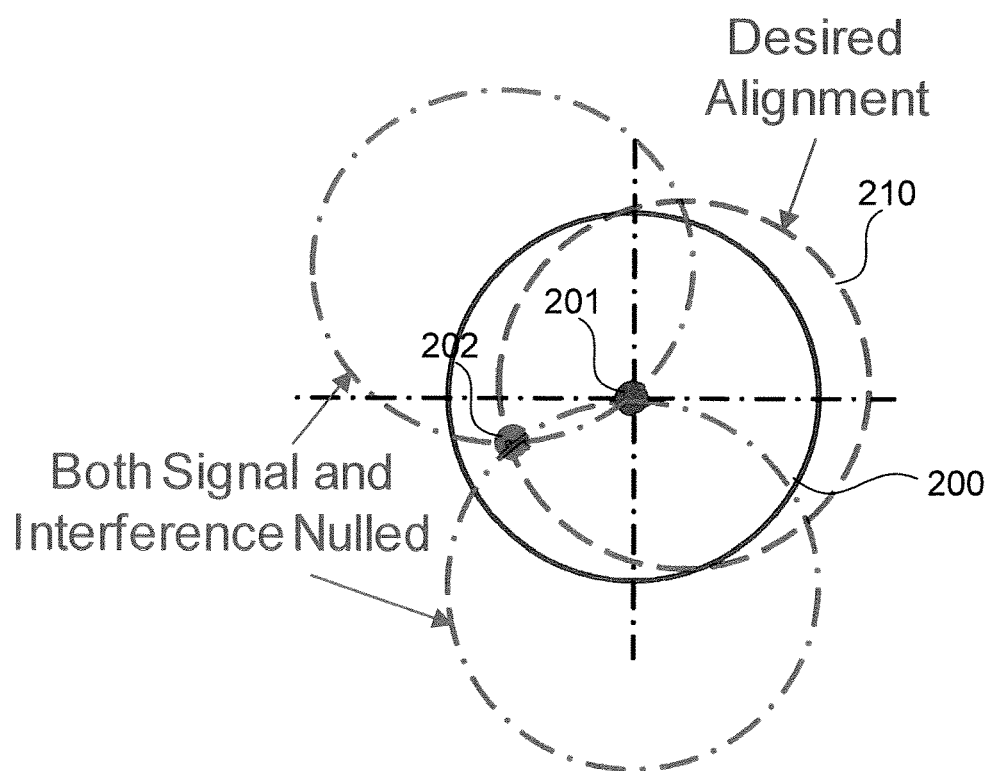
FIG. 2A schematically illustrates repositioning of an antenna, according to one exemplary configuration.

In many adaptive antenna systems, a pattern null surrounds the interference produced by combining two or more antenna elements. Adaptive beam repositioning such as provided herein differs from such implementations because the pattern null between the main beam and first sidelobes are inherent in the antenna design and fundamentally differs from the combination of multiple antenna elements used in previously known adaptive antennas. The main beam is simply repositioned to align the antenna's pattern null between the main beam and first sidelobes with the interference. A variety of choices exist in aligning this pattern null such as illustrated in FIG. 2A. The desired alignment 210 can be selected to maximize the SNIR by nulling the interference 202 while optimizing the S/N of the desired signal 201. Two alternative alignments are also indicated in this figure that null both the interference and the desired signal as well that is not desirable. As mentioned earlier the desired alignment nulls the interference to maximize the SNIR at the expense of some loss in the desired signal's S/N as illustrated in FIG. 5C.

Figure 2B:
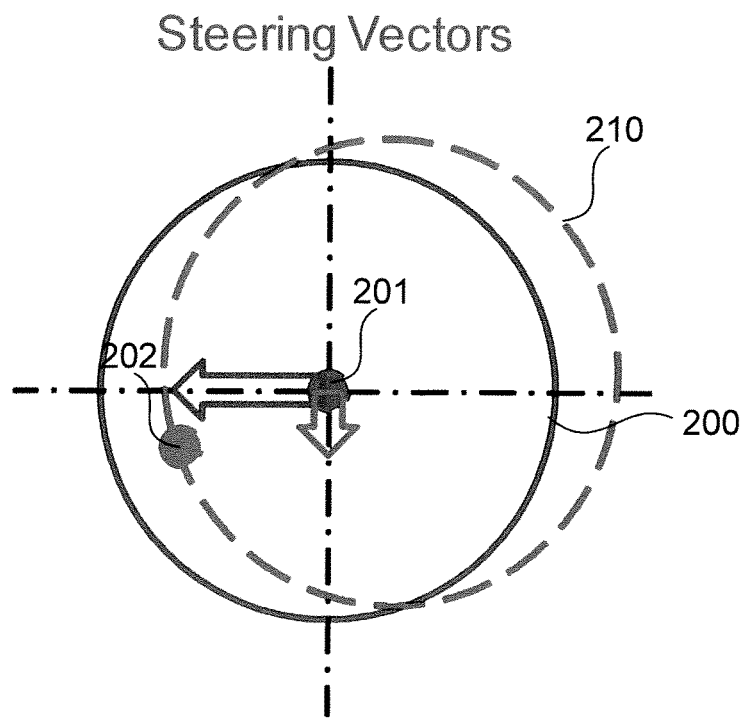
FIG. 2B schematically illustrates application of steering vectors during repositioning of an antenna, according to one exemplary configuration.
Figure 7:
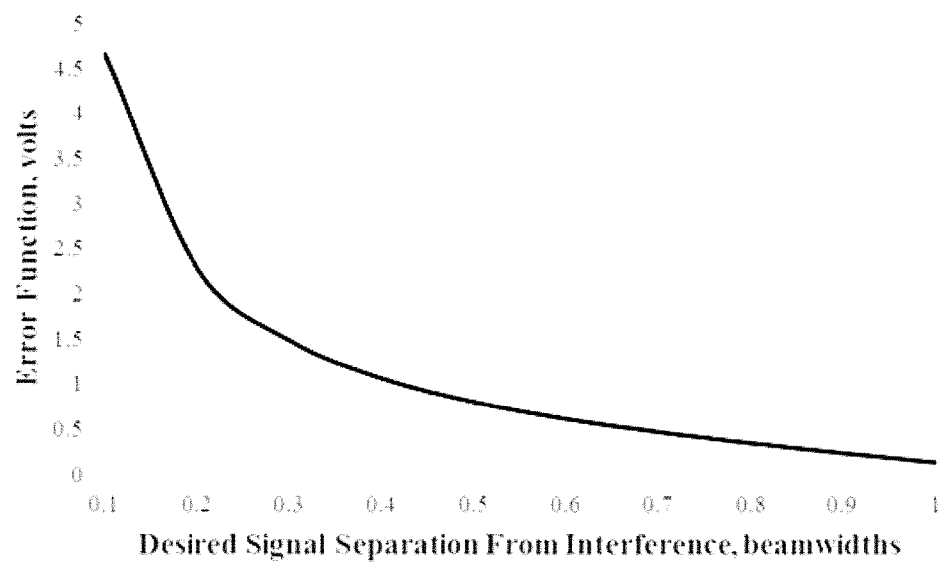
FIG. 7 illustrates a plot of error function versus angular separation between a desired signal and directional interference, according to one exemplary configuration.

As provided herein, the controller open loop can reposition the main beam based on error signals based on the ratio of the excised frequency bins in the sum beam $I_\Sigma$ divided by the excised interference power $I_A$ in each respective orthogonal plane. The two orthogonal ratios form error signals for beam repositioning that provide the magnitude of the steering vectors such as indicated in FIG. 2B. The error signal values can depend on the separation between the desired signal and the interference such as illustrated in FIG. 7. The error signal values for practical implementations can be determined from the a priori knowledge of the actual antenna's main beam pattern and can refine those in FIG. 7. Given the magnitude of the error signals, the controller 170 can drives the error to zero or approximately zero by commanding the beam repositioning based on the steering vector indicated in FIG. 2B.

While the magnitudes of these two error signal values obtained from the levels of the excised frequency bins determine the angular separation between the desired signal and interference in orthogonal planes, the sign of the ratios is also required to determine the directions of the steering vector, e.g., up versus down and left versus right. The sign of the ratios can be obtained from the sign of the two cross correlations between the sum and two difference channels $X_{A\Sigma}$. In the example steering vectors in FIG. 2B, the cross correlation values are both negative so that the antenna is repositioned to the left and down in this example illustration.

In operation, when excessive interference is detected, the closed loop antenna tracking ceases, the ratio of the excised interference bins, the cross correlation between the signal identifiers, and the sum channel are used by the controller 170 to determine the angular separation between the desired signal and the interference. Steering vectors in orthogonal planes are determined from the angular separation and the direction derived from the cross correlation of the sum and difference angles. The antenna is then open loop commanded to the repositioned location. Both the adaptive excision values and the correlation of the sum beam with the signal identifier are monitored to determine the interference reduction and the desired signal reduction. While interference is present, the antenna position is maintained by the open loop commanding and the received signal level (indicated by $X_{\Sigma P}$ in FIG. 1C) and interference reduction indicated by the excised frequency bins continues to respond to changes in the interference spectrum and/or position. This open loop tracking operation continues until interference ceases, at which time, closed loop tracking is reactivated (corresponding to 308 in FIG. 3A).

Controller 170 illustrated in FIG. 1A can be configured to control antenna positioner 180 so as to reposition antenna 110 away from the directional interference based on steering vectors such as illustrated in FIG. 2B. The controller 170 also can be configured so as to monitor the reduction in interference power (referred to as indicator $I_\Sigma$ in FIG. 1C) and the desired signal reduction indicated by the cross correlation (referred to as $X_{\Sigma P}$ in FIG. 1C) of the sum beam (referred to as 15 in FIG. 1C) with the signal identifier (referred to as 31 in FIG. 1C) so as to determine changes in the interference spectrum and/or location. Such monitoring can verify the correctness of the steering vectors used to reposition the antenna. Depending on the implementation, the controller 170 can also be configured so as to control or include the adaptive excision circuitry 160. For example, controller 170 can be configured so as to examine the frequency bin contents in real time and based on the a priori determined threshold value decide whether to delete the bin or bins containing excessive interference. Additionally, if excessive interference is initiated, the processor 170 can command the closed loop antenna tracking to cease and provide the commanding for the open loop beam repositioning. The excised bins can be set to zero in the sum and two difference beam channels and their values are retained by the processor 170 to determine the separation between the desired signal and interference in orthogonal planes based on the error response such as illustrated in FIG. 7, and command the beam repositioning also using the cross correlation product (referred to as $X_{\Sigma\Delta}$ in FIG. 1C) to produce the orthogonal steering vector. The processor 170 also can be configured so as to monitor the interference and when such interference ceases, command the antenna to return to closed loop tracking.

For example, controller 170 can be configured so as to output control signal 171 for controlling antenna positioner 180 so as to reposition antenna 110 to place the directional interference within a null between the main beam and a sidelobe of the main beam. FIG. 2A schematically illustrates repositioning of an antenna 110 and FIG. 2B schematically illustrates application of steering vectors during repositioning of the antenna, according to one exemplary configuration. In FIG. 2A, antenna 110 has an initial main beam alignment 200 centered on desired signal 201. However, such initial alignment can also encompass directional interference 202, resulting in degradation of receipt of the desired signal. Based on the outputs from analog conditioners 130, power detectors 140, correlators 150, and excision circuits 160, controller 170 can control antenna positioner 180 following the error response such as illustrated in FIG. 7 and the signs of the cross correlation values (referred to as $X_{\Delta\Sigma}$ in FIG. 1C) so as to apply steering vectors such as illustrated using the arrows in FIG. 2B, so as to reposition the main beam of antenna 110 so as to locate directional interference 202 at the pattern null edge of the repositioned main beam 210. Although antenna 110 so repositioned in FIGS. 5A and 5B is no longer centered on desired signal 201, the SNIR can be significantly improved based on exclusion of directional interference 202 from the main beam of the antenna at the expense of some loss in S/N such as illustrated in FIG. 5C. Note that certain other possible beam alignments, such as indicated in the dash-dotted circles in FIG. 2A, can position both the desired signal 201 and the directional interference 202 at a null in the repositioned main beam 210, thus reducing the desired signal power to too large a degree. The exemplary desired alignment in FIG. 2A (dashed outline) lies halfway between the other two example alignments as guided by the steering vectors in FIG. 2B to obtain as much S/N as possible.

Referring again to FIG. 1A, controller 170 can be configured to generate a processed output 172 of the antenna main beam based upon the measures 165 from excision circuits 160 and provide such output, for example, to demodulator(s) 190. In this regard, note that the power of the directional interference within output 172 can change over time, for example, based on repositioning of antenna 110 based on commands sent from controller 170 to antenna positioner 180. Such repositioning can, for example, reduce the power of directional interference that is received by antenna 110, and excision circuits 160 further can excise any excessive interference, thus increasing SNIR of the desired signal within output 172 while achieving as much S/N as possible.

Note that controller 170 illustrated in FIG. 1A optionally can be configured so as to perform antenna repositioning as part of an open-loop and/or closed-loop tracking process. For example, controller 170 can be configured so as to control antenna positioner 180 to track the desired signal in a closed-loop configuration unless the power of directional interference exceeds a threshold, to cease closed-loop tracking so as to reposition the antenna 110 in an open-loop configuration so as to reduce the directional interference below the threshold, and then to resume closed-loop tracking when excessive interference ceases as indicated by the excised frequency bins containing interference. In one non-limiting configuration, controller 170 can be configured to, based upon the measures 144 output being below a threshold, control antenna positioner 180 so as to track the desired signal in a closed loop; to, based upon the measures exceeding the threshold, control the antenna positioner 180 so as to cease tracking the desired signal; and after controlling the antenna positioner so as to reposition the antenna away from the directional interference, to control the antenna positioner so as to resume tracking the desired signal in a closed loop so as to sufficiently maintain power of the desired signal received by the antenna while sufficiently reducing power of the directional interference received by the antenna.

Figure 1B:
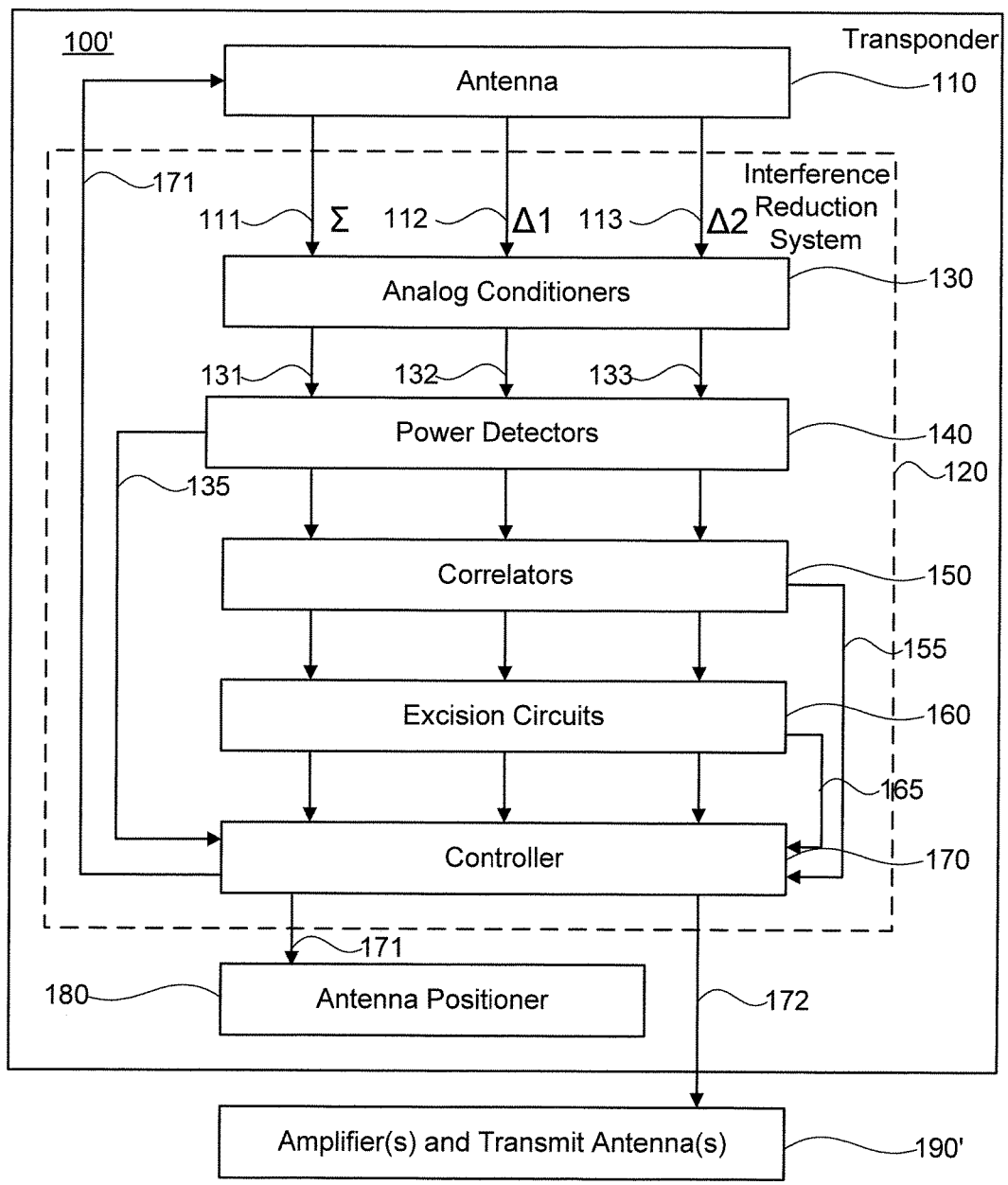
FIG. 1B schematically illustrates a system for reducing interference in a transponder, according to one exemplary configuration.
Figure 1C:
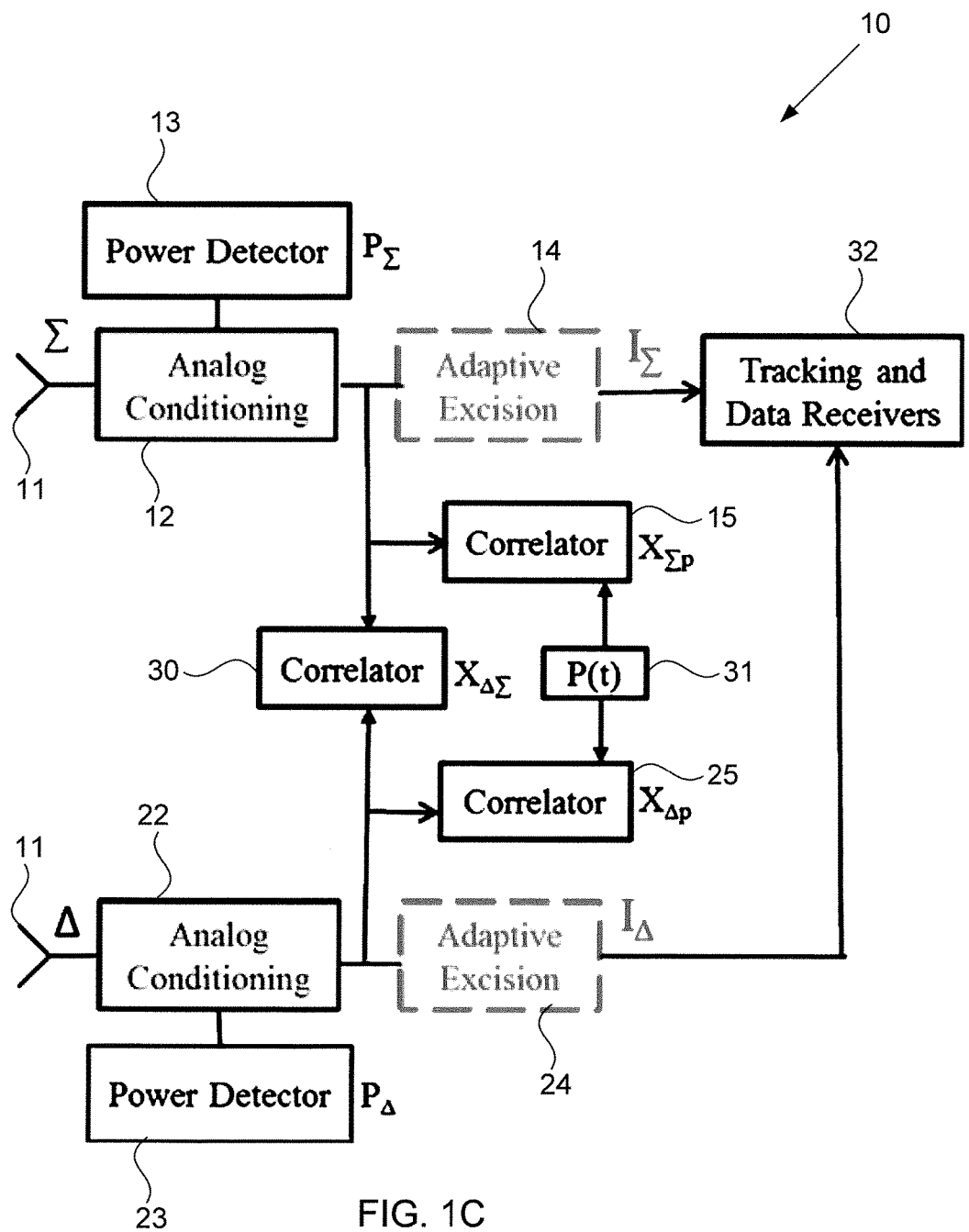
FIG. 1C schematically illustrates a system for reducing interference in a receiver or a transponder, according to one exemplary configuration.

Note that interference reduction systems such as provided herein, e.g., interference reduction system 120 illustrated in FIG. 1, suitably can be incorporated into or coupled to any system using an high gain, narrow beamwidth antenna having a monopulse tracking capability to receive signals. For example, FIG. 1B schematically illustrates a system for reducing interference in a transponder 100', according to one exemplary configuration. Transponder 100' can be configured similarly to receiver 100 illustrated in FIG. 1A, but can be configured so as to transmit the processed signal to a remote user for remote demodulation, rather than locally demodulating the signal. In transponder 100', controller 170 is configured to provide output 172 to amplifier and transmit antenna(s) 190', which then amplify and transmit the processed signal to one or more individual user(s), each of whom has their own demodulator(s). A further benefit of average power detection (referred to as $P_\Sigma$ in FIG. 1C) and the cross correlation of the sum beam and signal identifier $X_{\Sigma P}$ is the knowledge these indicators provide on the total desired signal power that allows the transmitter gain to be controlled so that the design operating point of the transmitter is maintained with varying signal loading optimizing the transmitter's power efficiency.

FIG. 1C schematically illustrates a system for reducing interference in a receiver or a transponder, according to one exemplary configuration. System 10 illustrated in FIG. 1C includes a directional antenna 11 configured to generate a sum beam ($\Sigma$) and two difference beams ($\Delta$, not shown separately from one another) that receive a desired signal and also potential directional interference. System 10 also includes analog conditioning circuitry 12 for the sum beam and analog conditioning circuitry 22 for the difference beams. System 10 also includes a power detector 13 coupled to analog conditioning 12 and configured to detect the power ($P_\Sigma$) of the sum beam, which power can be output to the system controller (not specifically illustrated). System 10 also includes a power detector 23 coupled to analog conditioning 22 and configured to detect the respective powers ($P_\Delta$) of the difference beams, which powers can be output to the system controller (not specifically illustrated). System 10 also includes a first correlator 30 configured to generate a first correlation ($X_{\Delta\Sigma}$) between the sum beam and the two difference beams and to provide such correlation to the system controller (not specifically illustrated). System 10 also includes second correlator 15 configured to generate a second correlation ($X_{\Sigma p}$) between the sum beam and a signal identifier (P(t)). System 10 also includes third and fourth correlators 25 respectively configured to generate third and fourth correlations ($X_{\Delta p}$) between the difference beams and the signal identifier (P(t)). The signal identifier can include, for example, a low level pseudorandom code P(t) added to the desired signal to assist with identifying the desired signal in the presence of thermal noise and potential interference, or can exist in the desired signal structure, e.g., a frequency hopped code pattern or framing data or preamble. The low level pseudorandom code is known to both the origin of the received signal and the receiving antenna but is not available to an adversary for exploitation. In optional configurations in which the signal identifier includes a pseudorandom code, system 10 can include a generator 31 of such a code. The first, second, third, and fourth correlations can be provided to the system controller (not specifically illustrated).

System 10 illustrated in FIG. 1C further can include first adaptive excision circuitry 14 configured to receive the conditioned sum beam from analog conditioning circuitry 12, and to excise (set to zero) those frequency bins containing excessive interference and to output those frequency bin interference levels to the controller (not specifically illustrated) a measure $I_\Sigma$ of directional excessive interference within the sum beam, and second and third adaptive excision circuitry 24 configured to excise those frequency bins containing excessive interference and to output to the system controller measures $I_\Delta$ of directional interference within the two orthogonally aligned difference beams. Tracking and data receivers 32 receive the analog conditioned signals excised of excessive interference. The antenna 11 is repositioned based upon the information received from power detectors 13, 23, correlators 15, 25, and 30, and adaptive excision circuitry 14, 24 to form the steering vectors such as illustrated in FIG. 2B in a manner similar to that of controller 170 described with reference to FIGS. 1A-1B.

It should be appreciated that in systems such as 100, 100', and 10, interference can degrade link performance in two ways. The first way is direct interference with the desired signal that is potentially high enough to produce nonlinear system operation and the second way is beam misalignment from interference-induced antenna tracking errors. In configurations including closed loop antenna tracking, such tracking can be stopped when interference starts (or exceeds a threshold) so that the interference location can be determined without closed-loop beam alignment changes that potentially can alter the tracking indicators. Beam repositioning can be implemented by open loop commanding, and interference changes can be monitored to maintain and update beam repositioning to respond to such changes. Closed loop tracking can resume when interference is no longer present (or is below a threshold). Adaptive excision can dynamically identify interference and closed-loop antenna tracking can be started or stopped in real time based upon such identification, whereas correlation products and average power measurements in previously known adaptive beam repositioning can be subject to averaging time delays.

Note that in systems such as 100, 100', and 10, the antenna can be configured so as to provide three independent beams, the sum beam that receives and processes the desired signal and two difference beams which can be orthogonally aligned and used to dynamically track the desired signal. The sum and difference beams are individually correlated with the signal identifier, e.g. P(t), for example, using correlators 150, 15, or 25. The resulting correlations can respond to only the desired signal since analog noise and interference are not correlated with the signal identifier. Further, the ratios of the difference and sum correlations also can form an error response and validate proper antenna tracking for the interference-free case.

In systems such as 100, 100', and 10, adaptive beam repositioning can provide several indicators that can be applied so as to reposition the beam. For example, three spectral components can be present: the signal S, the interference I, and the analog noise N.

At the RF level, the outputs 135 or $P_\Sigma$, $P_\Delta$ of the respective power detectors 140, 13, 23 for the sum and two difference beams can respond to the desired signal, interference, and noise components. In the absence of interference, the ratio of the difference channel levels to the sum level can be relatively small since difference signals can be received through the difference channel null. Further, the difference over sum ratios can be independent of the signal level variations so that signal tracking can be independent of signal level fluctuations, which is a typical feature of monopulse tracking. Based upon interference being present, the levels of these three indicators can increase, but the ratios of the difference and sum beams can significantly increase since interference is not aligned with the difference pattern null. The ratios can indicate the initiation of interference.

The cross correlations of the sum and difference channels 155, $X_{\Delta \Sigma}$, are not expected to respond to analog noise N since the sum and difference noise is not correlated. Without interference, the cross correlation values can be comparable and small since the antenna is aligned with the difference beam null and independently verify closed loop tracking performance. Based upon interference I being present, coherent interference components also can be received by the sum and two difference beams, and like the coherent signal S, can produce a cross correlation value. However, since the interference is not aligned with the difference pattern nulls, the ratios can be significantly different from the interference-free case.

The sum and difference channels can be correlated with a signal identifier, e.g., P(t), producing correlations 155, $X_{\Sigma p}$ that dynamically identify the desired signal power level and its variation 155, $X_{\Delta p}$ indicates difference channel power and their ratios also indicate proper tracking. The signal identifier can be an added pseudorandom signal or a correlation on a signal framing feature, for example. These correlations are not expected to respond to either analog noise or interference since the signal identifier, e.g., P(t), is absent from both. A useful feature of such correlations is that their output can solely depend on the desired signal and can be unobscured by either interference or noise levels. This feature can allow received power level measurements on the sum channel and the difference/sum ratios to indicate the distance from the interference-free tracking position and corresponding signal power loss.

When adaptive excision is added, additional indicators or measures, 165 or $I_\Sigma$, $I_\Delta$ can be provided by the excised frequency bins respectively containing interference for both the sum and difference channels. The ability to distinguish interference components results from their relatively high level. The ratio of the difference and sum ratios for interference bins can differ from the corresponding ratios of bins containing only desired signals since the interference location differs from the desired signal source location. These differences in ratio values dynamically confirm interference presence. The frequency bins used by adaptive excision, e.g., excision circuits 160 or 14, 24 can identify the initiation of interference, its spectral distribution, and time variations of the spectral distribution, and thus can facilitate exclusion and excision of such interference. Moreover, such indication of interference initiation can be performed in real time because it dynamically responds to interference rather than being limited by averaging time. Furthermore, adaptive excision can dynamically identify interference exclusive of desired signal so that desired signals and interference are independently monitored and thus beam repositioning can separately evaluate its effect on signal and interference levels.

Note that interference alignment with the null between the main beam and first sidelobe differs from other nulling situations. For example, adaptive nulls can generally occur at a single spot encompassing the interference that results from adaptively combining two or more antenna elements. In this case, however, the pattern null is a circular contour circumscribing the main beam, and a multitude of ways exist to align this circular null contour with the interference. As stated earlier, both S/N and SNIR cannot be simultaneously optimized and some signal loss can be expected when aligning the null with the interference. The indicators such as provided by components of systems 100, 100', and 10 can provide means to reposition the beam to both align a null with interference while maintaining sufficient received signal power. The desired repositioning illustrated in FIG. 2A indicating the main beam 200 moves from being centered on the desired signal 201 so as to align the pattern null 210 with the directional interference 202 while maintaining sufficient gain for the desired signal 201. The other dash dot alignments null both the interference and the desired signal so that the objective is to reposition the beam a halfway between the null contours in order to null the interference while maintaining sufficient signal power, e.g., as much signal power as possible.

In systems such as systems 100, 100', and 10, the addition of adaptive excision in both the sum and difference channels can dynamically and exclusively identify interference presence by the excessive power levels in the bins. The two ratios of the sum and difference powers in the excised frequency bins, e.g., $I_\Sigma$ and the two $I_\Delta$ values, provides the error response values such as illustrated in FIG. 7 that quantify the separation between the desired signal and the interference in both orthogonal directions and are routed to controller 170. The direction of the steering vectors such as in FIG. 2B can be obtained from the sign of the two cross correlations $X_{\Delta\Sigma}$ of the sum and difference beams. The error response values and the sign are routed to the controller 170 to reposition the beam to achieve the desired orientation, such as shown in FIG. 2A, that optimizes the SNIR while reducing S/N by a suitable amount, e.g., a minimal amount. The ratios of the difference and sum power outputs together with the error response such as in FIG. 7 can indicate the angular separation between the antenna's original boresight location and the interference in orthogonal planes. The error response such as in FIG. 7 can equal the ratio of excised frequency bin levels in the sum beam $I_\Sigma$ divided by excised frequency bin levels. Two sum over difference ratios of the excised frequency bin powers, $I_\Sigma/I_\Delta$, can yield the angular separation of the interference from the desired signal in orthogonal directions as detected by the excision circuitry, e.g., circuitry 160 or 14, 24.

The two power ratios, however, do not provide the sign of the error response. The sign of the error response can be obtained by the signs of the cross correlations between the sum and difference channels $X_{\Delta\Sigma}$ so that both the magnitudes of the interference offset from the desired signal and their signs are determined in orthogonal planes. With this information that can be interpreted as steering vectors, the antenna can be commanded to properly align the main beam's circumferential null with the interference using offset directions such as illustrated in FIG. 2B, where the arrows indicate the steering vector in the orthogonal directions. The interference reduction can be indicated by the sum channel's reduced power levels and the adaptive excision output in the sum beam. The reduction in the signal level can also be determined by the sum channel's correlation with the signal identifier, e.g., P(t). Thus, the indicators from the excision outputs can provide the dynamic identification of interference initiation to avoid interference-induced tracking errors and the beam repositioning information that is commanded and monitored by the indicators. The indicators allow both the null alignment with the interference as well as the signal loss resulting from beam repositioning.

Systems 100, 100', 10 can continue to monitor the indicators so as to determine if the interference persists or has changes in spectral characteristics and/or direction. Additionally, the signal level variations also indicate changes in the received signal power. The antenna tracking when interference is present can use open loop commanding based on indicator values. When interference ceases, closed loop tracking can resume.

Additional features and benefits provided by the present systems and methods include, but are not limited to, one or more of the following:

1. Maintaining linear operation by excising high interference levels that would produce nonlinear system operation and by measuring the desired signal power, the transmitter gain can be varied to maintain the desired operating point for varying signal input levels in transponders to optimize power efficiency.

2. Provide insight into interference spectral characteristics and their time variation.

3. The excision provides the ability to isolate interference from desired signals and use the separated interference components in aligning the null with interference.

4. Adaptive excision can reduce the time to identify interference initiation and command the control system to cease closed loop tracking to avoid initial pointing misalignments that would reduce desired signal levels and vary the indicators.

5. Adaptive excision can provide information on the level, spectral, and temporal nature of the interference for use in repositioning the antenna.

6. By dynamically identifying interference, a means to notify users to exercise adaptive coding is provided to allow a more timely initiation of adaptive coding.

7. Using the knowledge of frequency bins assigned to authorized users, signals occupying unassigned frequency bins can indicate unauthorized users that can be excised.

8. Identify communication traffic variations to excise signal spectral portions containing noise that have no communication value and to dynamically control the transmitter input gain level to maintain the design transmitter operating point to avoid transmitter nonlinear operation and maintain its power efficiency, in a manner similar to that provided in U.S. Pat. Nos. 8,614,940 and 8,711,675 to Dybdal et al.

Figure 3A:
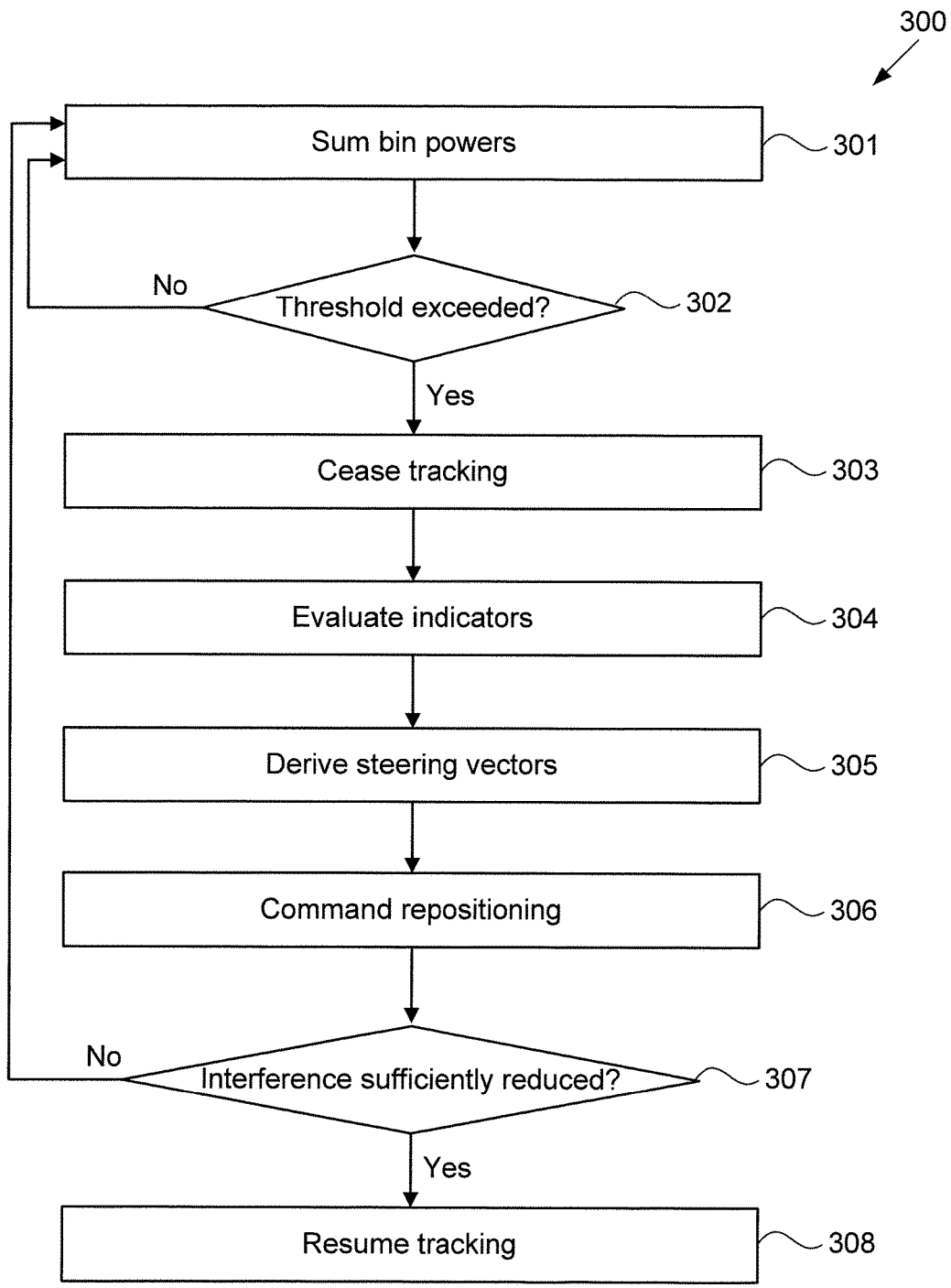
FIG. 3A illustrates a method for reducing interference, according to one exemplary configuration.

FIG. 3A illustrates a method for reducing interference, according to one exemplary configuration. Method 300 illustrated in FIG. 3A includes summing bin powers (301), e.g., summing the powers of spectral bins generated by excision circuit 160 of systems 100, 100' or adaptive excision circuits 14, 24 of system 10. The bin powers are compared to a threshold and it is determined whether the threshold is exceeded (302). When interference is not present, the system operates normally using closed loop antenna tracking, and the bin powers continue to be summed so as to monitor for interference. When interference initiation is dynamically identified by the frequency bin(s) that exceed the threshold, the control system can be commanded to cease closed loop tracking (303), for example to avoid interference-induced tracking errors. Indicators of interference can be evaluated (304). For example, as discussed herein, interference presence also can be indicated and evaluated based on the powers of the sum and difference beams (e.g., the outputs of power detectors 140 or 13, 23) and based on the cross correlation levels of the sum and difference channels and optionally also their imbalance in the difference over sum ratios. The interference can be located, for example, based on the difference over sum ratios of the interference bin(s) power and based on the signs determined from the cross correlations of the sum and difference channels. This information can be used to derive steering vectors (305) for the beam repositioning that is commanded (306). If the interference ceases (307), then closed loop tracking can be resumed (308). The reduction in interference power resulting from such repositioning can be indicated by the power detectors, the cross correlation between the sum and difference signals, and in the adaptive excision frequency bins. The loss of signal power can be indicated by the correlation with the signal identifier, e.g., P(t), in a manner such as described herein. If the interference is not sufficiently reduced, then steps 301-307 can be repeated until the interference is sufficiently reduced.

Figure 3B:
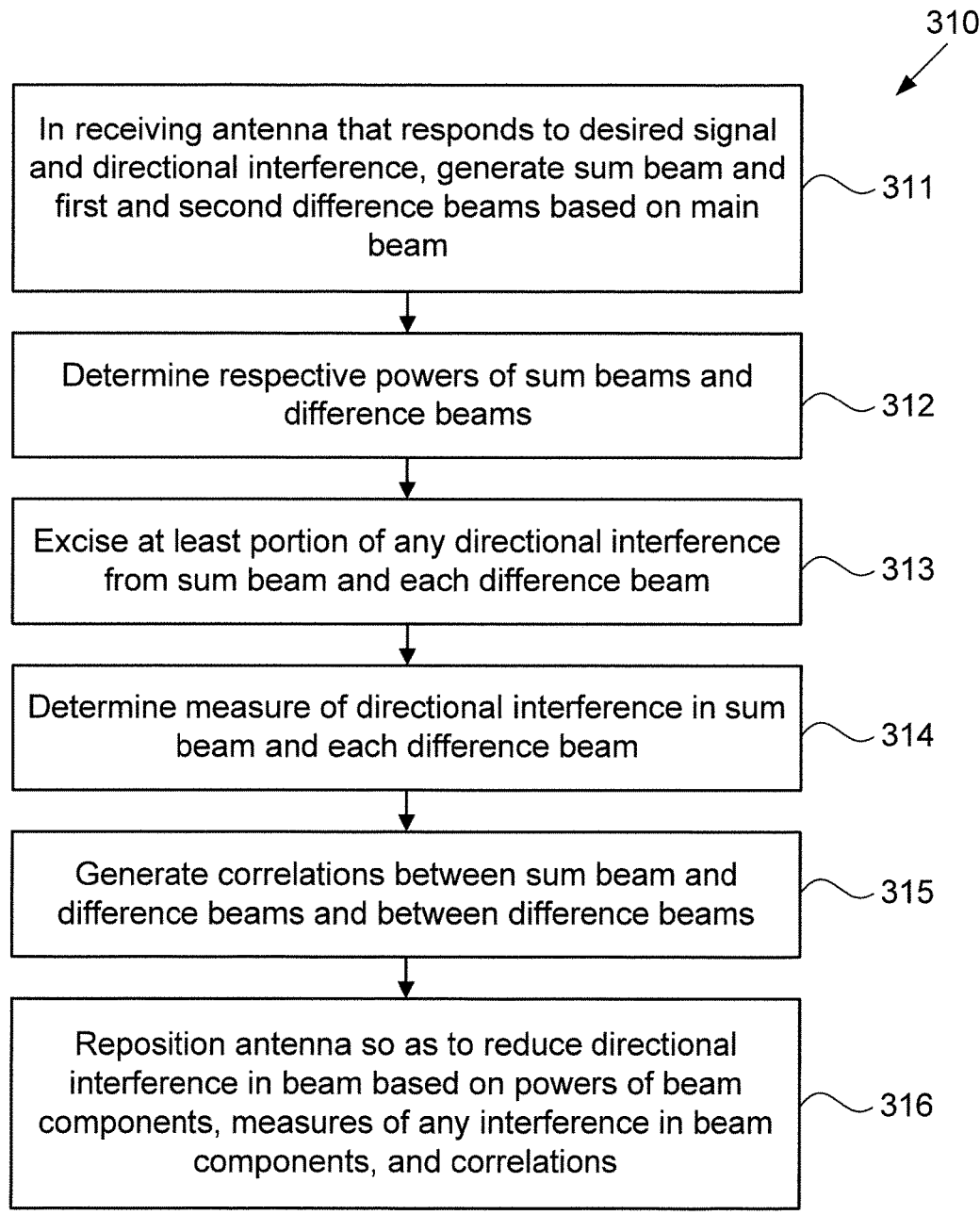
FIG. 3B illustrates another method for reducing interference, according to one exemplary configuration.

FIG. 3B illustrates another method for reducing interference, according to one exemplary configuration.

Method 310 illustrated in FIG. 3B includes, in a receiving antenna that responds to both desired signal and potential directional interference components (e.g., at antenna 110 illustrated in FIG. 1A or antenna 11 illustrated in FIG. 1C), generating a sum beam and first and second difference beams based on the main beam (311). Method 310 also includes determining respective powers of the sum beam and the first and second difference beams (312). For example, power detectors 140 illustrated in FIG. 1A or power detectors 13, 23 illustrated in FIG. 1C can be configured so as to determine such powers in a manner such as described elsewhere herein. Method 310 also includes excising at least a portion of any of the directional interference from the sum beam and the first and second difference beams (313). For example, excision circuits 160 illustrated in FIG. 1A or adaptive excision circuitry 14, 24 illustrated in FIG. 1C can be configured so as to perform such excision in a manner such as described elsewhere herein. Method 310 also can include determining measures of the directional interference in the sum beam and the first and second difference beams (314). For example, excision circuits 160 illustrated in FIG. 1A or adaptive excision circuitry 14, 24 illustrated in FIG. 1C can be configured so as to determine such measures in a manner such as described elsewhere herein. Method 310 also can include generating a first correlation between the sum beam and the first and second difference beams (315). For example, correlators 150 illustrated in FIG. 1A or correlator 30 illustrated in FIG. 1C can be configured so as to perform such correlation in a manner such as described elsewhere herein. Method 310 also can include repositioning the antenna away from the directional interference based on the powers, the measures, and the first correlation (316). For example, controller 170 can command antenna positioner 180 so as to reposition antenna 110, or tracking and data receivers 32 can reposition antenna 11, away from the directional interference in a manner such as described elsewhere herein. Options for the excising, measures, and bases for tracking or repositioning the antenna are described elsewhere herein.

It should be appreciated that method 310 illustrated in FIG. 3B can be performed in conjunction with, or independently of, method 300 illustrated in FIG. 3A. Any suitable combinations of steps in FIGS. 3A and/or 3B can be used. For example, a directional antenna can repositioned based on determining respective powers of the sum beam and the first and second difference beams; excising at least a portion of any of the directional interference from the sum beam and the first and second difference beams; determining measures of the directional interference in the sum beam and the first and second difference beams; generating a first correlation between the sum beam and the first and second difference beams; based upon the excision sufficiently removing the directional interference, open loop tracking the desired signal; and based upon the excision insufficiently removing the directional interference, repositioning the antenna away from the directional interference based on the powers, the measures, and the first correlation.

Figure 4:
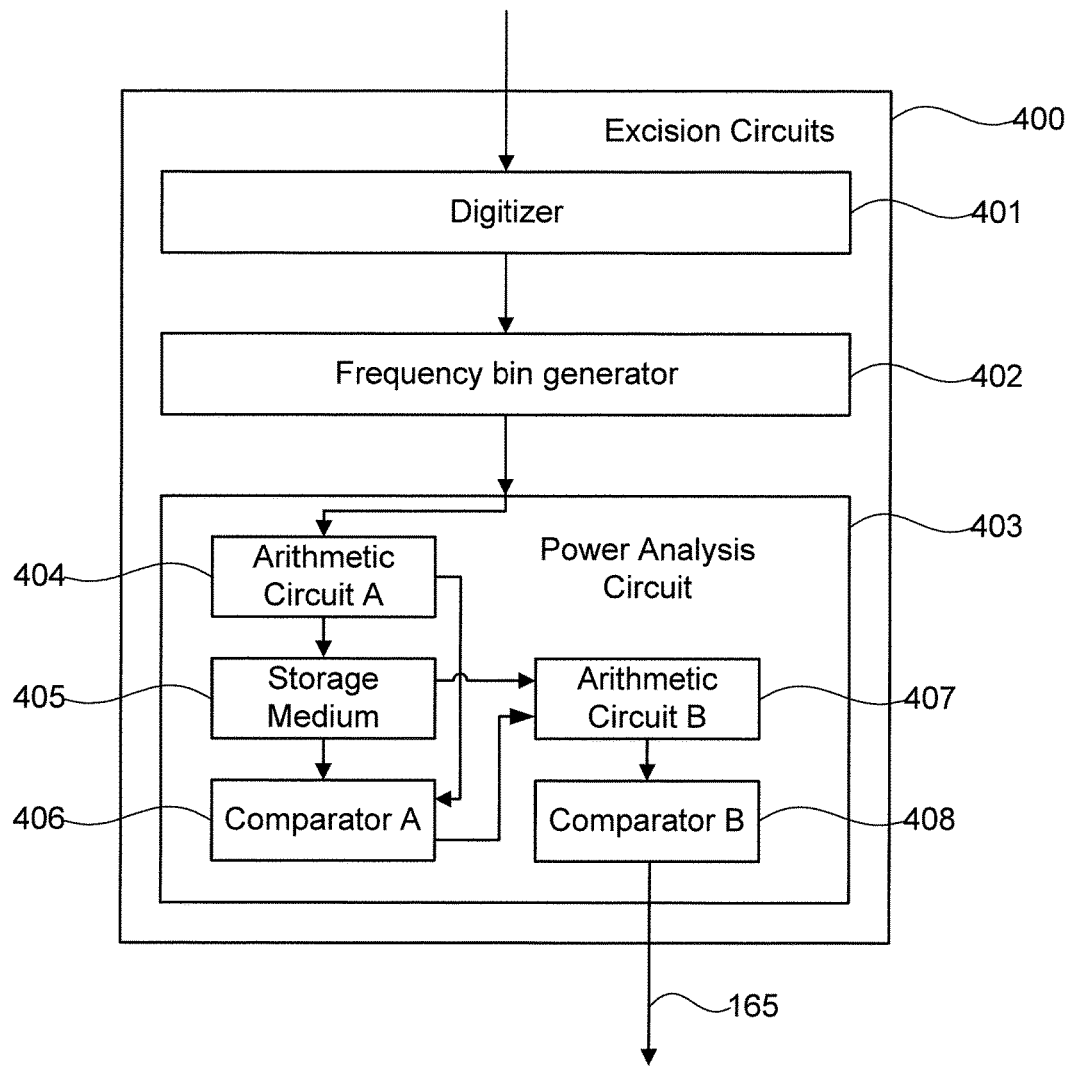
FIG. 4 illustrates a second subsystem for excising interference and generating measures of interference, according to one exemplary configuration.

FIG. 4 schematically illustrates a subsystem 400 for excising interference and generating measures of interference, e.g., a selected one of excision circuits 160 or adaptive excision circuitry 14, 24, according to one exemplary configuration. In the illustrative configuration of FIG. 4, subsystem 400 can include digitizer 401, such as an analog-to-digital (A/D) converter, configured to receive and digitize a conditioned analog signal generated by a respective one of analog conditioners 130 or analog conditioning circuitry 12, 23, e.g., signal 131, 132, or 133. Subsystem 400 also can include a frequency bin generator 402, such as a digital polyphaser filter band or a fast Fourier transform (FFT) circuit configured to receive and perform an FFT of the digitized signal output by digitizer 401. Subsystem 400 also can include power analysis circuit 403 configured to receive, analyze, and reduce interference contributions to the spectral bins output by bin generator 402, to output a measure of the interference in the bins to appropriate circuitry, e.g., to output signal 165 to correlators 150 and/or controller 170 or to output $I_\Sigma$ or $I_\Delta$ to controller 170. Power analysis circuit 403 also can be configured so as to output the remaining bins following such excision to appropriate circuitry, e.g., to controller 170. Subsystem 400 or controller 170 or tracking and data receivers 32 can include circuitry e.g., a polyphaser filter band or an iFFT circuit, configured to convert the remaining bins back to the time domain. The processing of the indicators 135 and 165 can be integrated into the controller 170 or implemented as a separate subsystem.

Digitizer 401 can include a suitable input port configured to couple to analog conditioners 130 for a respective one of the sum and two difference channel inputs 131, 132, 133 via suitable conductive elements (input port and conductive element not specifically illustrated). The conductive element can include, for example, a coaxial cable, a transmission line, or any other suitable conductor configured to transmit the respective conditioned analog signal 131, 132, or 133 which can be within a pre-defined spectral band. Digitizer 401 can be configured to digitize and quantize the respective three analog signals, e.g., signal 131. As known to those of skill in the art of digital signal processing, digitizers such as A/D converters are commercially available devices that generate a digital version of an analog signal by sampling that signal at a specified rate, and mapping the power levels of that analog signal onto quantization levels in a digital data stream. A/D converters can have a fixed resolution, that is, can have a fixed number of quantization levels onto which it can map the power levels of the analog signal. For example, A/D converters with an 8-bit resolution can be configured to map analog power levels onto 255 quantization levels. In practical implementations, the A/D quantization is selected to accommodate the desired signal and the highest anticipated interference power as understood by those practiced in the art. Digitizer 401 provides as output to frequency bin generator 402 via a suitable conductive element (not specifically illustrated) a digitized, quantized version of the respective sum and both difference beams, and a digitized, quantized version of any interference that shares the same spectral band as that beam (e.g., that was not filtered out by analog conditioners 130).

The output of digitizer 401 can be provided to any suitable frequency bin generators 402 for each sum and both difference channels 402 that is configured so as to generate for that output a set of spectral bins that spans a bandwidth of the desired signal within the corresponding sum or difference beam. As one example, a digital polyphase filter band can be used. As another example, a discrete Fourier transform (DFT) can be used to determine the frequency components of a signal that varies in time. An FFT is a particular variant of DFT, in which the input signal has a number of points N that is a power of two, and is Fourier transformed using an algorithm that is particularly efficient at obtaining a DFT of an input signal having a number of points that is a power of two, such as the Cooley-Tukey algorithms known in the art. The output of a DFT is a spectrally resolved version of the input signal, in which different spectral components of the incoming signal are mapped onto a predefined number (e.g., for an FFT, a power of two) of spectral "bins." In one nonlimiting configuration, the signal output by digitizer 401 has a number of points N that is a power of two, and frequency bin generator 402 is configured to perform an FFT on that signal. Circuits for performing FFTs, as well as other types of Fourier transformations of digital signals or otherwise generating spectral bins, are commercially available or can be custom-designed. In one exemplary configuration, frequency bin generator 402 provides as output a set of spectral bins, at least some of which contain portions of the group of signals within the sum and both difference beams, and at least one of which can contain interference. Each bin of the sum and first set has a power level corresponding to the summed power levels of any spectral components—be they based on the desired group of signals or based on the interference—that have been mapped to that bin. Frequency bin generator 402 provides the resulting set of spectral bins, respectively corresponding to the sum beam or one of the difference beams, to a suitable input port of power analysis circuit 403 via a suitable conductive element (input port and conductive element not specifically illustrated).

Analog conditioners 130, digitizer 401, and frequency bin generator 402 can be configured so as to ensure that linear operation is maintained prior to interference excision for the highest anticipated interference level. In one nonlimiting configuration, the analog components (e.g., analog conditioners 130, power detectors 140, and correlators 150) have a sufficiently high 1 dB compression value relative to the input of digitizer 401 so as to maintain linear operation. In practice, the gain distribution can be examined and in some cases, the receiver noise temperature can be increased somewhat by reducing the analog gain values to achieve the required linearity. The clipping levels and quantization used in the digital technology (e.g., digitizer 401 and frequency bin generator 402) likewise can be selected to avoid digital overflow or nonlinear operation in the digital technology used prior to interference excision.

Power analysis circuit 403 is configured to excise one or more of the spectral bins of the set of spectral bins that it receives from frequency bin generator 402 as appropriate, for example based on the collective power of the set of bins and/or based on the power of each bin individually. By "excise" it is meant that power analysis circuit 403 reduces the power levels of such spectral bins to zero or about zero in some configurations, or to a predetermined non-zero level in other configurations. Specifically, power analysis circuit 403 can be configured to compare the collective power of all of the bins of the set to a predefined threshold, which can be based on the linear range of operation of demodulator 190, amplifier(s) and transmit antenna(s) 190', or tracking and data receivers 32. In one illustrative example, if demodulator 190 is limited to a maximum input signal level to achieve the required demodulation linearity, then the predefined threshold can be established to limit the signal power output to somewhat less than the maximum demodulator input level, e.g., to 50% lower than the maximum input to accommodate peak-to-average signal variations and is commonly described as headroom. If power analysis circuit 403 determines that the collective power level of the set of bins exceeds the predetermined threshold, then the circuit can establish a dynamically defined threshold selected to facilitate identification and excision of interference that can be present, while reducing the risk that the desired group of signals within that set of bins also can be excised. To do so, power analysis circuit 403 can determine the amount by which the collective power level of the bins of the set must be reduced to satisfy the predetermined threshold, and then can establish the dynamically defined threshold at such a value that, if bins having powers exceeding that threshold are excised, it would reduce the collective power of the set of bins to or below the predetermined threshold. Power analysis circuit 403 then can excise any bins that exceed the dynamically defined threshold, e.g., by setting the power levels of such bins to zero.

Power analysis circuit 403 can include any suitable circuitry configured to store the predefined threshold, to compare the collective power of the spectral bins to the predefined threshold, to establish the dynamically defined threshold, and to excise any bins that exceed the dynamically defined threshold. For example, in the configuration illustrated in FIG. 4, power analysis circuit 403 can include arithmetic circuit A 404, storage medium 405, comparator A 406, arithmetic circuit B 407, and comparator B 408. Arithmetic circuit A 404 can be configured to obtain the set of spectral bins output by frequency bin generator 402, e.g., via a suitable conductive element (not specifically illustrated), and to sum the power levels of the spectral bins of that set so as to obtain a collective power level of the bins of that set. Storage medium 405 can be configured to store the predefined threshold. In some configurations, the predefined threshold is based on the known linearity characteristics of the circuitry to receive the bins following excision, which can be established at the time receiver 100 or transponder 100' is designed and constructed. Comparator A 406 can be coupled, e.g., via appropriate conductive elements, to storage medium 405, from which it receives the predefined threshold, and to arithmetic circuit A 404, from which it receives the set of spectral bins as well as the collective power level of the set of spectral bins. Comparator A 406 can be configured to compare the collective power of the set of spectral bins to the predefined threshold.

Comparator A 406 also can be coupled to arithmetic circuit B 407, e.g., via an appropriate conductive element, so as to provide to arithmetic circuit B 407 with the set of spectral bins, as well as a signal indicating the amount (if any) by which the collective power of the set of spectral bins exceeds the predefined threshold. Arithmetic circuit B 407 also can receive the predefined threshold, either from comparator A 406 or from storage medium 405, as is illustrated in FIG. 4. Arithmetic circuit B 407 can be configured to obtain a dynamically defined threshold having a value such that, if bins having powers exceeding that threshold are excised, it would reduce the collective power of the set of bins to or below the predetermined threshold. Arithmetic circuit B 407 is coupled to comparator B 408, e.g., via an appropriate conductive element. Comparator B 408 receives the spectral bins, as well as the dynamically defined threshold from arithmetic circuit B 407. Comparator B 408 is configured to set to excise, e.g., set to zero, any spectral bins that exceed the dynamically defined threshold, and to generate two outputs. The first output 144 can provide a measure of the interference in the respective beam, e.g., can include any excised bins of the set of spectral bins corresponding to that beam, and is provided to controller 170 for use in determining the location of the directional interference and repositioning the antenna. The second output 141 can include the remaining (non-excised) bins of the set of spectral bins corresponding to that beam, and is provided to correlators 150 for use in generating correlations and to controller 170 for further processing, e.g., demodulation or the like.

Note that arithmetic circuits A and B 404, 407, comparators A and B 406, 408, and storage medium 405 can be implemented using any suitable logic circuits known in the art. For example, arithmetic circuits are known in the art and are commercially available, as are comparators and storage media, and suitably can be coupled together with conductive elements. In other configurations, the functionalities of one or more of arithmetic circuits A and B 404, 407, comparators A and B 406, 408, and/or storage medium 405 can be provided by a suitably programmed field-programmable gate array (FPGA) or application-specific integrated circuit (ASIC). FPGAs and ASICs are commercially available, and methods of programming same to achieve desired logical programming are known in the art. In still other configurations, the functionalities of one or more of arithmetic circuits A and B 404, 407, comparators A and B 406, 408, and storage medium 405 can be provided by a suitably programmed computer, e.g., a suitably programmed general purpose computer. Additionally, note that circuitry other than arithmetic circuits A and B 404, 407, comparators A and B 406, 408, and storage medium 405 can be used to provide power analysis circuit 403 with functionality analogous to that described herein.

Note that the operation of the present interference reduction systems and methods can occur in "real-time." For example, the components of interference reduction system 120 can reduce directional interference as signals arrive by excising such interference and/or moving the antenna away from such interference. By comparison, adaptive notch filters and previously known adaptive interference cancellation techniques can rely on iterative spectral analysis of the interference to derive the adaptive filter's weighting coefficients, potentially resulting in time delays in adjusting to changes when the interference spectrum dynamically varies over time relatively rapidly or in an unpredictable manner.

While various illustrative embodiments of the invention are described above, it will be apparent to one skilled in the art that various changes and modifications may be made therein without departing from the invention. For example, interference reduction system 120 can be configured to work with, and to be coupled to, a pre-existing receiver 100 or transponder 100', but need not necessarily be considered to be an integral part of such a receiver or transponder, and indeed suitably may be used with any circuitry that would benefit from interference reduction. The appended claims are intended to cover all such changes and modifications that fall within the true spirit and scope of the invention.

What is claimed:

1. A system for repositioning a directional antenna that responds to a desired signal and directional interference, the antenna generating a sum beam and first and second difference beams, the system comprising:
   an antenna positioner coupled to the directional antenna;
   a controller coupled to the antenna positioner;
   power detectors respectively configured to output to the controller powers of the sum beam and the first and second difference beams;
   excision circuits respectively configured to (a) excise at least a portion of the directional interference from the sum beam and the first and second difference beams and (b) output to the controller a measure of the directional interference in that beam; and
   a first correlator configured to output to the controller a first correlation between the sum beam and the first and second difference beams,
   wherein the controller is configured to control the antenna positioner so as to reposition the antenna away from the directional interference based on the powers, the measures, and the first correlation.

2. The system of claim 1, wherein each of the excision circuits is configured to:
   digitize the sum beam or the first or second difference beam;
   provide as output a set of spectral bins for that beam spanning a bandwidth of the desired signal, each bin having a respective power level, at least one bin including the interference;
   compare a collective power level of the bins to a predetermined threshold; and
   based upon the collective power level exceeding the predetermined threshold, excise at least one bin that includes the interference.

3. The system of claim 2, wherein the measures comprise the power levels of the bins from the digitized first difference beam, the power levels of the bins from the digitized second difference beam, and the power levels of the bins from the digitized sum beam.

4. The system of claim 3, wherein the controller is configured to control the antenna positioner so as to reposition the antenna based on:
   a distance between the interference and the desired signal in a first plane determined based on a ratio of the power levels of the bins from the digitized first difference beam and the power levels of the bins from the digitized sum beam; and
   a distance between the interference and the desired signal in a second plane determined based on a ratio of the power levels of the bins from the digitized second difference beam and the power levels of the bins from the digitized sum beam, the second plane being orthogonal to the first plane.

5. The system of claim 4, wherein the wherein the controller is configured to control the antenna positioner so as to reposition the antenna further based on a sign of the first correlation indicating a direction of the interference in the first and second planes.

6. The system of claim 2, wherein the predetermined threshold is selected such that the collective power of the spectral bins following excision is sufficiently low to maintain linear operation of the system.

7. The system of claim 1, wherein the controller is configured to control the antenna positioner so as to reposition the antenna to place the directional interference within a null between a main beam and a sidelobe of the main beam.

8. The system of claim 1, wherein the controller further is configured to:
based upon the measures being below a threshold, control the antenna positioner so as to track the desired signal in a closed loop;
based upon the measures exceeding the threshold, control the antenna positioner so as to cease tracking the desired signal; and
after controlling the antenna positioner so as to reposition the antenna away from the directional interference, control the antenna positioner so as to resume tracking the desired signal in a closed loop so as to sufficiently maintain power of the desired signal received by the antenna while sufficiently reducing power of the directional interference received by the antenna.

9. The system of claim 1, wherein the desired signal further includes a signal identifier, the system further comprising:
a second correlator configured to output to the controller a second correlation between the signal identifier and the sum beam; and
third and fourth correlators respectively configured to output to the controller third and fourth correlations between the signal identifier and the first and second difference beams,
wherein the controller further is configured to control the antenna positioner so as to reposition the antenna away from the directional interference based on the second, third, and fourth correlations.

10. The system of claim 9, wherein the signal identifier comprises a pseudorandom code added to the desired signal.

11. The system of claim 9, wherein the signal identifier comprises an existing feature of the desired signal wherein the existing feature is a frame format, preamble, or other characteristics unique to the desired signal.

12. A method for repositioning a directional antenna that responds to a desired signal and directional interference, the antenna generating a sum beam and first and second difference beams, the method comprising:
determining respective powers of the sum beam and the first and second difference beams;
excising at least a portion of the directional interference from the sum beam and the first and second difference beams;
determining measures of the directional interference in the sum beam and the first and second difference beams;
generating a first correlation between the sum beam and the first and second difference beams; and
repositioning the antenna away from the directional interference based on the powers, the measures, and the first correlation.

13. The method of claim 12, wherein the excising comprises:
digitizing the sum beam and the first and second difference beams;
generating a set of spectral bins for that digitize beam spanning a bandwidth of the desired signal, each bin having a respective power level, at least one bin including the interference;
comparing a collective power level of the bins to a predetermined threshold; and
based upon the collective power level exceeding the predetermined threshold, excising at least one bin that includes the interference.

14. The method of claim 13, wherein the measures comprise the power levels of the bins from the digitized first difference beam, the power levels of the bins from the digitized second difference beam, and the power levels of the bins from the digitized sum beam.

15. The method of claim 14, wherein the antenna is repositioned based on:
a distance between the interference and the desired signal in a first plane determined based on a ratio of the power levels of the bins from the digitized first difference beam and the power levels of the bins from the digitized sum beam; and
a distance between the interference and the desired signal in a second plane determined based on a ratio of the power levels of the bins from the digitized second difference beam and the power levels of the bins from the digitized sum beam, the second plane being orthogonal to the first plane.

16. The method of claim 15, wherein the antenna is repositioned further based on a sign of the first correlation indicating a direction of the interference in the first and second planes.

17. The method of claim 13, wherein the predetermined threshold is selected such that the collective power of the spectral bins following excision is sufficiently low to maintain linear operation.

18. The method of claim 12, comprising repositioning the antenna to place the directional interference within a null between a main beam and a sidelobe of the main beam.

19. The method of claim 12, further comprising:
based upon the measures being below a threshold, tracking the desired signal in a closed loop;
based upon the measures exceeding the threshold, cease tracking the desired signal; and
after repositioning the antenna away from the directional interference, resume tracking the desired signal in a closed loop so as to sufficiently maintain power of the desired signal received by the antenna while sufficiently reducing power of the directional interference received by the antenna.

20. The method of claim 12, wherein the desired signal further includes a signal identifier, the method further comprising:
generating a second correlation between the signal identifier and the sum beam; and
generating third and fourth correlations respectively between the signal identifier and the first and second difference beams,
wherein the antenna further is repositioned away from the directional interference based on the second, third, and fourth correlations.

21. The method of claim 20, wherein the signal identifier comprises a pseudorandom code added to the desired signal.

22. The method of claim 20, wherein the signal identifier comprises an existing feature of the desired signal wherein the existing feature is a frame format, preamble, or other characteristics unique to the desired signal.

23. A method for repositioning a directional antenna that responds to a desired signal and directional interference, the antenna generating a sum beam and first and second difference beams, the method comprising:
- determining respective powers of the sum beam and the first and second difference beams;
- excising at least a portion of the directional interference from the sum beam and the first and second difference beams;
- determining measures of the directional interference in the sum beam and the first and second difference beams;
- generating a first correlation between the sum beam and the first and second difference beams;
- based upon the excision sufficiently removing the directional interference, tracking the desired signal; and
- based upon the excision insufficiently removing the directional interference, repositioning the antenna away from the directional interference based on the powers, the measures, and the first correlation.

* * * * *